(12) United States Patent
Ouyang et al.

(10) Patent No.: US 10,129,313 B2
(45) Date of Patent: Nov. 13, 2018

(54) SYSTEM, METHOD, AND LOGIC FOR MANAGING CONTENT IN A VIRTUAL MEETING

(71) Applicant: CISCO TECHNOLOGY, INC., San Jose, CA (US)

(72) Inventors: Hua Ouyang, Jiangsu (CN); Qi Shi, Jiangsu (CN); Huahua Yin, Jiangsu (CN); Yunwei Luo, Jiangsu (CN)

(73) Assignee: Cisco Technology, Inc., San Jose, CA (US)

( * ) Notice: Subject to any disclaimer, the term of this patent is extended or adjusted under 35 U.S.C. 154(b) by 533 days.

(21) Appl. No.: 14/618,764

(22) Filed: Feb. 10, 2015

(65) Prior Publication Data
US 2016/0234276 A1 Aug. 11, 2016

(51) Int. Cl.
| | |
|---|---|
| *G06F 3/00* | (2006.01) |
| *H04L 29/06* | (2006.01) |
| *G06Q 10/10* | (2012.01) |
| *H04N 7/15* | (2006.01) |
| *G06F 21/62* | (2013.01) |
| *H04L 12/18* | (2006.01) |
| *H04M 3/56* | (2006.01) |
| *H04N 7/14* | (2006.01) |

(52) U.S. Cl.
CPC ........ *H04L 65/602* (2013.01); *G06F 21/6218* (2013.01); *G06Q 10/10* (2013.01); *H04L 12/1813* (2013.01); *H04L 12/1822* (2013.01); *H04L 12/1827* (2013.01); *H04L 65/403* (2013.01); *H04M 3/567* (2013.01); *H04N 7/147* (2013.01); *H04N 7/15* (2013.01)

(58) Field of Classification Search
CPC . G06F 21/6218; G06Q 10/10; H04L 12/1813; H04L 12/1822; H04L 12/1827; H04L 65/403; H04L 65/602; H04M 3/567; H04N 7/147; H04N 7/15
See application file for complete search history.

(56) References Cited

U.S. PATENT DOCUMENTS

| | | | |
|---|---|---|---|
| 5,758,110 A | 5/1998 | Boss et al. | |
| 2007/0087791 A1* | 4/2007 | Feeney | A63F 13/12 455/567 |
| 2011/0202850 A1 | 8/2011 | Chan et al. | |
| 2011/0225542 A1* | 9/2011 | Schmieder | G06F 3/0481 715/794 |
| 2012/0027195 A1 | 2/2012 | Shaffer et al. | |
| 2013/0212488 A1 | 8/2013 | Scherpa | |
| 2015/0006672 A1* | 1/2015 | Morel | G06Q 30/0269 709/217 |
| 2015/0278534 A1* | 10/2015 | Thiyagarajan | G06F 21/62 726/28 |

* cited by examiner

*Primary Examiner* — Thanh T Vu

(57) ABSTRACT

An example method is provided and includes receiving an input associated with sharing data in a virtual meeting involving a first endpoint and a second endpoint associated with a meeting in a network environment. A window associated with an application that is running on the endpoint is scanned to determine a dataset for sharing, via the virtual meeting, with the second endpoint. The method also includes identify a portion of the dataset to restrict based on analyzing the dataset against a metric. The method also includes preventing a window of the at least one window from being transmitted, via the virtual meeting, to the second endpoint based on a determination that the window includes the portion of the dataset to restrict.

21 Claims, 12 Drawing Sheets

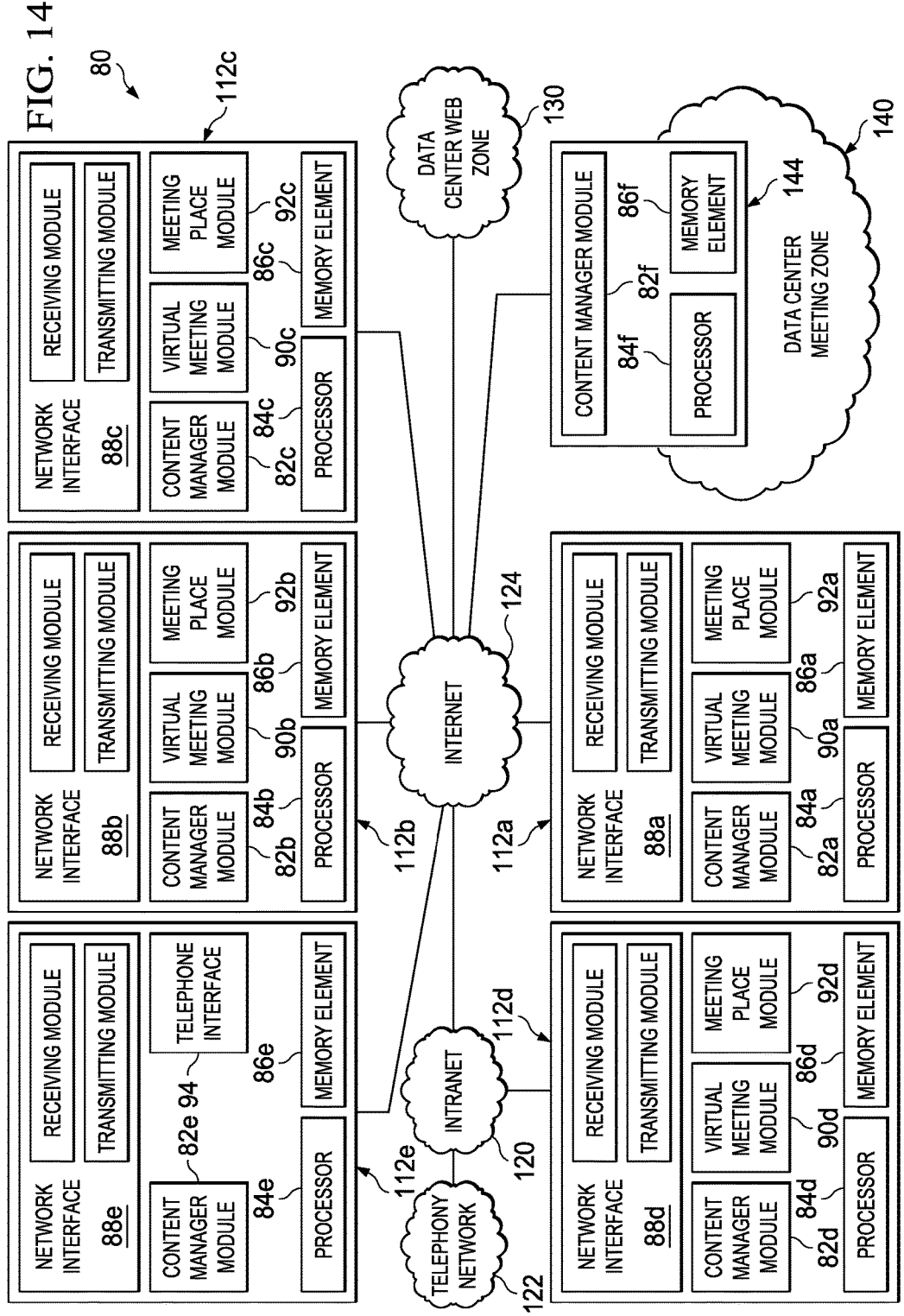

SYSTEM, METHOD, AND LOGIC FOR MANAGING CONTENT IN A VIRTUAL MEETING

TECHNICAL FIELD

The present disclosure relates generally to network systems and, more particularly, to managing content in a virtual meeting environment.

BACKGROUND

Virtual meeting systems allow users (i.e., using corresponding devices) to establish video and/or audio communications with one another. In some virtual meeting systems, a user may share a portion of their screen with other users within the virtual meeting. In such systems, because the screen can contain confidential information, sharing portions of the screen may results in sharing the confidential information with the other users in the virtual meeting. In some cases, the user may intentionally share the confidential information with the other users. However, in other cases, the user may unintentionally share the confidential information with the other users.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 14 is a simplified schematic diagram illustrating an example infrastructure of the communication system in accordance with some embodiments.

DESCRIPTION OF EXAMPLE EMBODIMENTS OF THE DISCLOSURE

Overview

Figure 1:
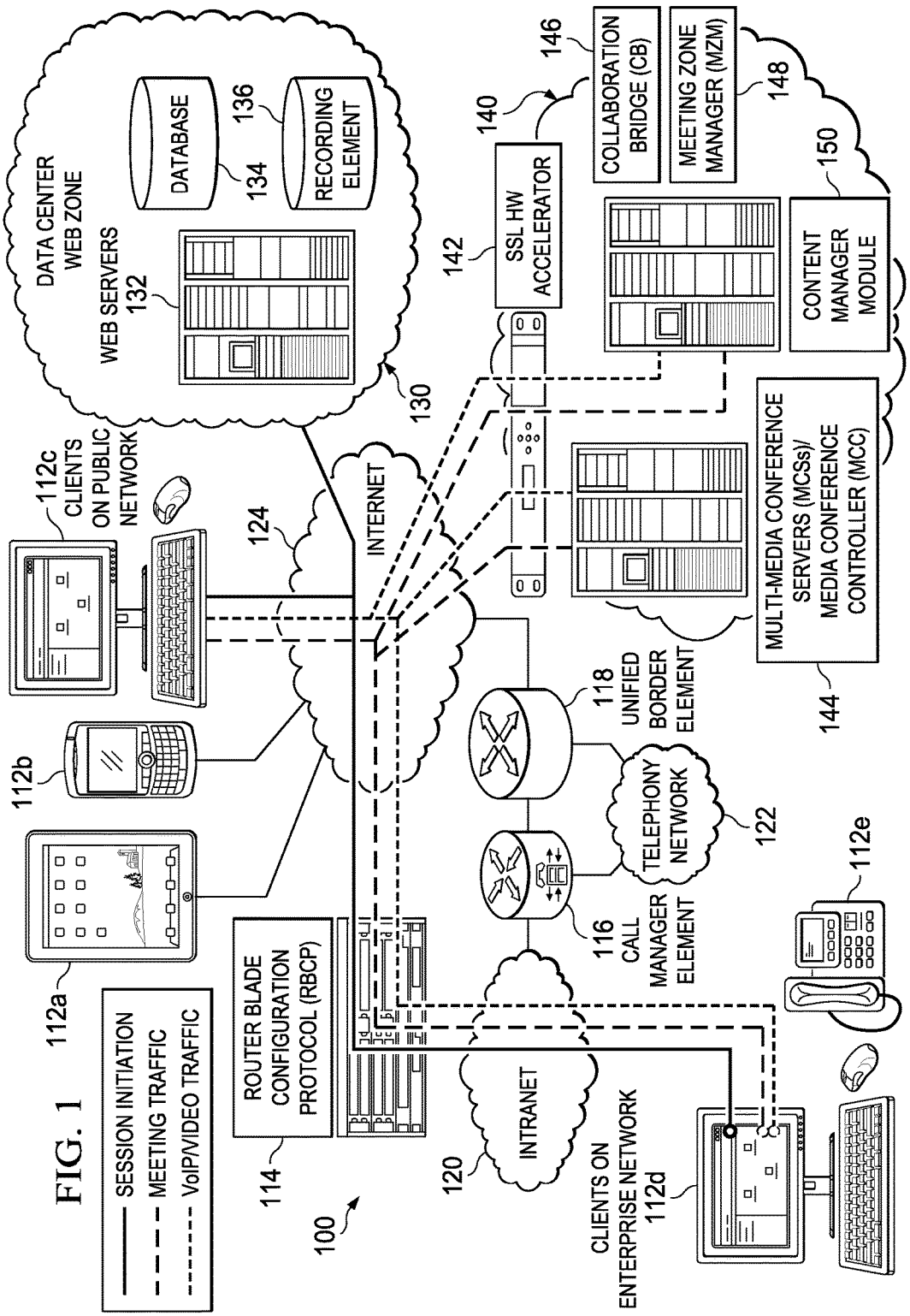
FIG. 1 is a simplified schematic diagram of a communication system for managing content in accordance with some embodiments of the present disclosure.

Example 1 is a method comprising receiving, at a first endpoint, an input associated with sharing data in a virtual meeting, the first endpoint involved in the virtual meeting with a second endpoint; scanning at least one window associated with an application that is running on the first endpoint to determine a dataset for sharing, via the virtual meeting, with the second endpoint; identifying a portion of the dataset to restrict based on analyzing the dataset against a metric; and preventing a window of the at least one window from being transmitted, via the virtual meeting, to the second endpoint based on a determination that the window includes the portion of the dataset to restrict.

In Example 2, the subject matter of Example 1 can optionally include generating a graphical notification that includes a first indicia and a second indicia, wherein the first indicia identifies the portion of the dataset to restrict and the second indicia identifies the window in which the portion of the dataset to restrict is included.

In Example 3, the subject matter of Example 2 or 3 can optionally include transmitting, via the virtual meeting, the window that includes the portion of the dataset to restrict to the second endpoint based on an additional input received using the graphical notification.

In Example 4, the subject matter of any of Examples 1-3 can optionally include when an additional input is received at the first indicia, rendering an image of the portion of the dataset to restrict as it appears in the window.

In Example 5, the subject matter of any of Examples 1-4 can optionally include the scanning the at least one window associated with the application that is running on the first endpoint comprising: scanning a hidden window that is hidden from being displayed; and scanning a visible window that is generated for display, wherein the hidden window and the visible window are associated with the application that is running on the first endpoint.

In Example 6, the subject matter of any of Examples 1-5 can optionally include the scanning the at least one window associated with the application that is running on the first endpoint comprising scanning all windows that are associated with all applications that are that are running on the first endpoint.

In Example 7, the subject matter of any of Examples 1-6 can optionally include: generating, by the first endpoint, a new window, wherein the new window is not one of the at least one window and the new window is defined, in part, by coordinates that correspond to a visible region of a screen; prior to revealing the new window, storing an image of content that is being generated for display, by the first endpoint, within the coordinates; determining whether transmit, via the virtual meeting, the new window to the second endpoint; when a determination is made to transmit the new window to the second endpoint, transmitting, via the virtual meeting, a rendering of the new window; and when a determination is made to not transmit the new window to the second endpoint transmitting, via the virtual meeting, the image instead of the new window.

Example 8 is one or more non-transitory media that includes code for execution and when executed by one or more processors performs operations comprising: receiving, at a first endpoint, an input associated with sharing data in a virtual meeting, the first endpoint involved in the virtual meeting with a second endpoint; scanning at least one window associated with an application that is running on the first endpoint to determine a dataset for sharing, via the virtual meeting, with the second endpoint; identifying a portion of the dataset to restrict based on analyzing the dataset against a metric; and preventing a window of the at least one window from being transmitted, via the virtual meeting, to the second endpoint based on a determination that the window includes the portion of the dataset to restrict.

In Example 9, the subject matter of Example 8 can optionally include the operations further comprising generating a graphical notification that includes a first indicia and a second indicia, wherein the first indicia identifies the portion of the dataset to restrict and the second indicia identifies the window in which the portion of the dataset to restrict is included.

In Example 10, the subject matter of Example 8 or 9 can optionally include the operations further comprising transmitting, via the virtual meeting, the window that includes the portion of the dataset to restrict to the second endpoint based on an additional input received using the graphical notification.

In Example 11, the subject matter of any of Examples 8-10 can optionally include the operations further comprising: when an additional input is received at the first indicia, rendering an image of the portion of the dataset to restrict as it appears in the window.

In Example 12, the subject matter of any of Examples 8-11 can optionally include the scanning the at least one window associated with the application that is running on the first endpoint comprising: scanning a hidden window that is hidden from being displayed; and scanning a visible window that is generated for display, wherein the hidden window and the visible window are associated with the application that is running on the first endpoint.

In Example 13, the subject matter of any of Examples 8-12 can optionally include the scanning the at least one window associated with the application that is running on the first endpoint comprising scanning all windows that are associated with all applications that are that are running on the first endpoint.

In Example 14, the subject matter of any of Examples 8-13 can optionally include the operations further comprising: generating, by the first endpoint, a new window, wherein the new window is not one of the at least one window and the new window is defined, in part, by coordinates that correspond to a visible region of a screen; prior to revealing the new window, storing an image of content that is being generated for display, by the first endpoint, within the coordinates; determining whether transmit, via the virtual meeting, the new window to the second endpoint; when a determination is made to transmit the new window to the second endpoint, transmitting, via the virtual meeting, a rendering of the new window; and when a determination is made to not transmit the new window to the second endpoint transmitting, via the virtual meeting, the image instead of the new window.

Example 15 is an endpoint comprising: a memory element configured to store electronic code, a processor operable to execute instructions associated with the electronic code, and a content manger module configured to interface with the processor and comprising electronic code, that when executed by the processor, performs operations comprising: receiving an input associated with sharing data in a virtual meeting, the endpoint involved in the virtual meeting with an other endpoint; scanning at least one window associated with an application that is running on the endpoint to determine a dataset for sharing, via the virtual meeting, with the other endpoint; identifying a portion of the dataset to restrict based on analyzing the dataset against a metric; and preventing a window of the at least one window from being transmitted, via the virtual meeting, to the other endpoint based on a determination that the window includes the portion of the dataset to restrict.

In Example 16, the subject matter of Example 15 can optionally include the operations further comprising: generating a graphical notification that includes a first indicia and a second indicia, wherein the first indicia identifies the portion of the dataset to restrict and the second indicia identifies the window in which the portion of the dataset to restrict is included.

In Example 17, the subject matter of Example 15 or 16 can optionally include the operations further comprising transmitting, via the virtual meeting, the window that includes the portion of the dataset to restrict to the other endpoint based on an additional input received using the graphical notification.

In Example 18, the subject matter of any of Examples 15-17 can optionally include the operations further comprising: when an additional input is received at the first indicia, rendering an image of the portion of the dataset to restrict as it appears in the window.

In Example 19, the subject matter of any of Examples 15-18 can optionally include the scanning the at least one window associated with the application that is running on the endpoint comprising: scanning a hidden window that is hidden from being displayed; and scanning a visible window that is generated for display, wherein the hidden window and the visible window are associated with the application that is running on the endpoint.

In Example 20, the subject matter of any of Examples 15-19 can optionally include the scanning the at least one window associated with the application that is running on the endpoint comprises scanning all windows that are associated with all applications that are that are running on the endpoint.

In Example 21, the subject matter of any of Examples 15-20 can optionally include the operations further comprising: generating a new window, wherein the new window is not one of the at least one window and the new window is defined, in part, by coordinates that correspond to a visible region of a screen; prior to revealing the new window, storing an image of content that is being generated for display, by the endpoint, within the coordinates; determining whether transmit, via the virtual meeting, the new window to the other endpoint; when a determination is made to transmit the new window to the other endpoint, transmitting, via the virtual meeting, a rendering of the new window; and when a determination is made to not transmit the new window to the other endpoint, transmitting, via the virtual meeting, the image instead of the new window.

Example Embodiments

When sharing content in a virtual meting a user may unintentionally share sensitive information to other users connected to the meeting. For example, because an endpoint may be executing a plurality of programs with some portions of the programs' content visible and other portions of the programs' content hidden, confidential content may be exposed if hidden portions of the content are revealed while sharing (e.g., sharing a desktop). The systems and methods described herein address such an issue (and other issues) by, prior to sharing, scanning both visible and/or hidden portions of content (e.g., interface components) for restricted content.

FIG. 1 is a simplified block diagram illustrating a communication system 100 for managing content in a meeting session environment. In specific implementations, communication system 100 can be provisioned for use in generating, managing, hosting, and/or otherwise providing virtual meetings. In certain scenarios (many of which are detailed below), communication system 100 may be configured for managing content in a virtual meeting session. The architecture of communication system 100 is applicable to any type of conferencing or meeting technology such as video conferencing architectures (e.g., TELEPRESENCE), web cam configurations, smartphone deployments, personal computing applications (e.g., SKYPE), multimedia meeting platforms (e.g., MEETINGPLACE, WEBEX, other virtual meeting client, etc.), desktop applications, or any other suitable environment in which data associated with a virtual meeting is sought to be managed.

Communication system 100 may include any number of endpoints 112*a-e* that can achieve suitable network connectivity via various points of attachment. In this particular example, communication system 100 can include an Intranet 120, a telephony network 122, and an Internet 124, which (in this particular example) offers a pathway to a data center web zone 130 and a data center meeting zone 140. Telephony network 122 may include, among other things, a voice over Internet protocol (VoIP) gateway and a public switched telephone network (PSTN).

Data center web zone 130 includes a plurality of web servers 132, a database 134, and a recording element 136. Data center meeting zone 140 includes a secure sockets layer hardware (SSL HW) accelerator 142, a plurality of multimedia conference servers (MCSs)/media conference controller (MCC) 144, a collaboration bridge 146, a meeting zone manager 148, and a content manager module 150. As a general proposition, each MCS can be configured to coordinate video and voice traffic for a given virtual meeting. Additionally, each MCC can be configured to manage the MCS from data center meeting zone 140. Each of endpoints 112*a-e* can be provisioned with one or more virtual meeting applications. A virtual meeting application may comprise, e.g., a virtual meeting client, a content manager module, or both (operably coupled to one another). A virtual meeting client is operable (e.g., by an endpoint) to establish a connection to a virtual meeting session. The content manager module is operable to, among other things, determine whether to share content in a virtual meeting.

Note that various types of routers and switches can be used to facilitate communications amongst any of the elements of FIG. 1. For example, a call manager element 116 and a unified border element 118 can be provisioned between telephony network 122 and Intranet 120. The call manager element is a network manager for IP phones. Also depicted in FIG. 1 are a number of pathways (e.g., shown as solid or broken lines) between the elements for propagating meeting traffic, session initiation, and voice over Internet protocol (VoIP)/video traffic.

Static data can be stored in data center web zone 130. For example, the scheduling data, the login information, the branding for a particular company, the schedule of the day's events, etc. can all be provided in data center web zone 130. Once the meeting has begun, any meeting experience information can be coordinated (and stored) in data center meeting zone 140. For example, if an individual were to share a document, or to transfer control of the meeting, then that meeting experience would be managed by data center meeting zone 140. In a particular implementation, data center meeting zone 140 is configured to coordinate the content management activities with endpoints 112*a-e* (e.g., via modules). Details concerning that possible implementation are described below with reference to FIG. 14.

Display hardware (e.g., a monitor) may be used to display one or more interface components. An interface component may include (but is not limited to) a desktop interface for an operating system, graphical user interface window, one of a plurality of windows associated with a process, a new window associated with an already running process, an icon, etc. A window may be an interface component that frames content (i.e., data) associated with a process. The window provides controls (e.g., buttons, menus, and other control elements) for display of the content (e.g., size, layout, location on the display, etc.). In some embodiments, a window may be an interface for separate instances of the application or may be individual windows for the same instance of the application. In some applications, a single window may include a plurality of sub-windows, each of which correspond to different content. A selected sub-window is generated for display on the monitor (e.g., is advanced to from being hidden to being displayed).

Figure 2:
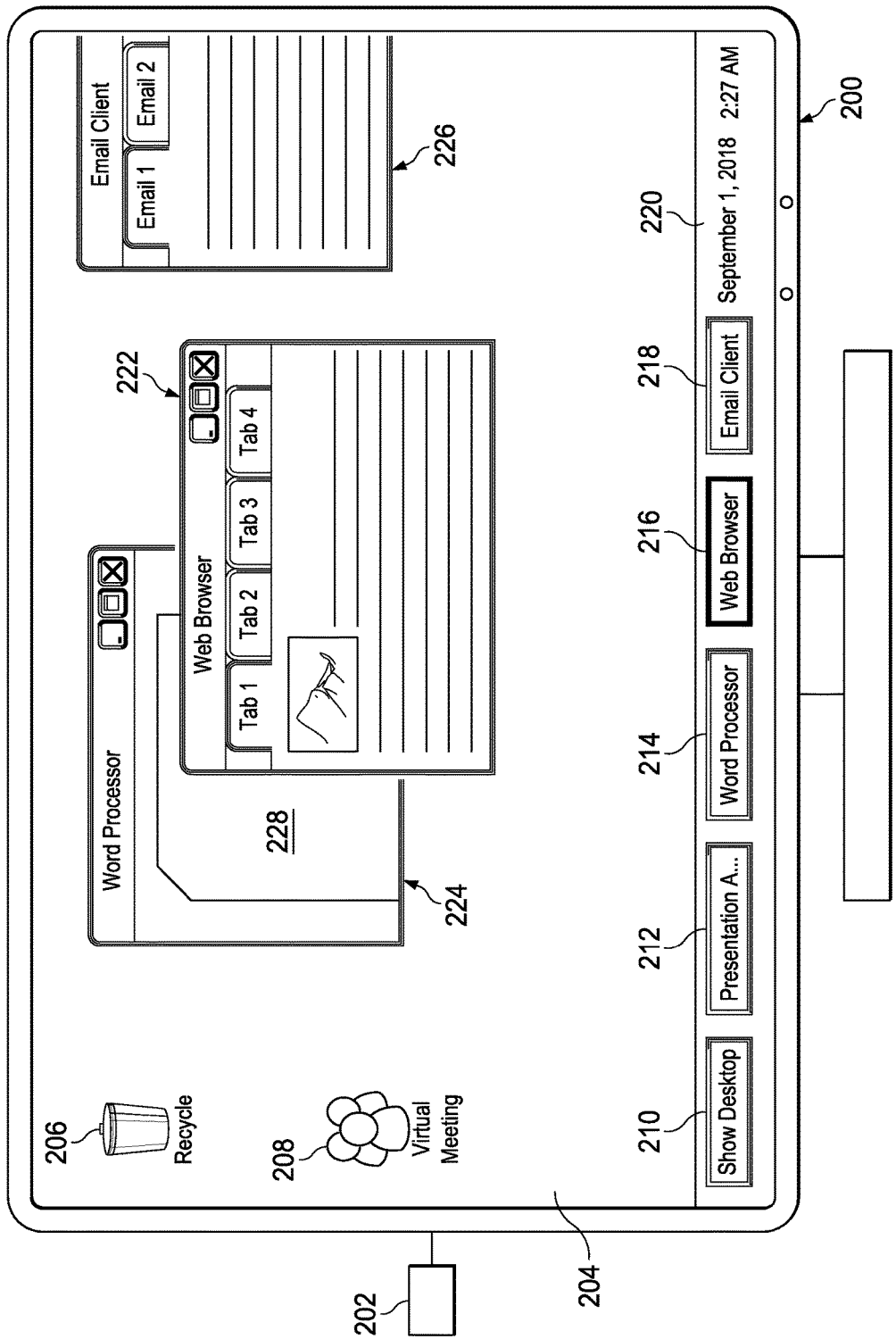
FIGS. 2, 3A, 3B, and 4 are simplified schematic diagrams illustrating example user interface graphics associated with possible implementations of the communication system.

FIG. 2 is a simplified schematic diagram illustrating example user interface graphics associated with possible implementations of the communication system. Endpoint 202 may connect to (i.e., join) a virtual meeting. In FIG. 2, the endpoint 202 is coupled to a monitor (screen) 200. The monitor 200 includes a display screen on which desktop 204 is displayed. The endpoint 202 is simultaneously executing (i.e., running) several applications. Each application may include a plurality of windows (e.g., windows launched by or as a part of the application). Each window may be visible in its entirety, invisible, or partially visible (partially invisible) on monitor 200 (and/or on the desktop 204). The desktop 204 is an interface component and includes recycle bin icon 206; virtual meeting application icon 208; windows 224, 222, and 226; toolbar 220; and toolbar components 210, 212, 214, 216, and 218. The icons 206 and 208 are operable to initialize execution of corresponding process (e.g., based on receiving an input, such as a click, at the icon). Icon 206 is operable to execute a process for an operating system-level process for erasing data from endpoint 202 (i.e., a recycle bin). Icon 208 is operable to execute a virtual meeting application (e.g., upon receiving an input such as a click action from a user input device).

The toolbar 220 includes a plurality of toolbar components (e.g., 210, 212, 214, 216, and 218). The toolbar component 210 is operable to initialize execution of a process for displaying desktop 204. Upon receiving an input at 210, endpoint 202 may reveal desktop 204 in its entirety (e.g., by hiding all visible windows corresponding to processes running on the endpoint, e.g., hiding windows 224, 222, 226). Each of toolbar components 212, 214, 216, and 218 correspond to a process that is running on the endpoint 202. In addition, each of toolbar components 212, 214, 216, and 218 are operable to reveal (e.g., to bring to front) a corresponding window. The toolbar components 214, 216, and 218 correspond to windows 224, 222, and 226, respectively. The toolbar component 212 corresponds to a window that is hidden and, therefore, its corresponding window is not displayed (e.g., is not generated for display) on the desktop 204.

Each of windows 224, 222, 226 and a hidden window correspond to applications that are running on the endpoint 202. Window 224 corresponds to a word processing application that is running on the endpoint 202. The window 224 displays a portion of document 228. The document 228 may be too long to be viewed in its entirety in a single window. The window 224 may enable navigating other portions of the document (e.g., by scrolling or panning). The window 224 is partially obstructed by window 222. Thus, the window 224 and the document 228 are each partially visible and partially invisible (partially hidden). The window 222 corresponds to a web browser application that is running on the endpoint 202. The web browser 222 is visible in its entirety and is a front-most window on the desktop 204 (e.g., because the window 222 has been brought to the front by selecting component 216). Toolbar component 216 is shaded to indicate that the window 222 is the front window. The web browser application window 222 includes a plurality of sub-windows. Each sub-window is labeled with a tab number (i.e., "Tab 1", "Tab 2", "Tab 3", "Tab 4"). Each of the sub-windows contains a different content. Selecting a sub-window brings to the front the content corresponding to the sub-window. Each of the sub-windows may behave as a separate window. The sub-windows may be disconnected from window 222. For example, a drag-and-drop command may be received to move one of the sub-windows outside of the extents of window 222 and, thereby, create a separate window for the sub-window. Any application may generate a single window including a plurality of sub-windows and/or may generate a plurality of separate windows. The window 226 corresponds to an email client application that is running on the endpoint 202. The window 226 includes sub-windows that correspond to three emails (i.e., "Email 1", "Email 2", and "Email 3"). The sub-windows for "Email 1" and "Email 2" are partially visible. The sub-window for "Email 3" is not visible. Within the window 226, the content of each of the sub-windows may be revealed based on receiving a selection corresponding to the sub-window (e.g., receiving a selection within a region of the sub-window or within a Tab corresponding to the sub-window). The sub-window that corresponds to each email may effectively behave as an independent window (though each is nested within a single window 226). The window 226 is partially visible and partially invisible since a portion of the window extends beyond the screen desktop. Turning now to the hidden window, the hidden window corresponds to a Presentation application that is running on the endpoint. The hidden window is not displayed (i.e., is invisible in its entirety) on the desktop 204 (e.g., due to having been minimized or otherwise hidden from display).

Semantically, a virtual meeting application is a client and server application. In some embodiments, the virtual meeting application may be a web-based application. In other embodiments, the virtual meeting application is a stand-alone application. A client module can be loaded onto an end user's endpoint via one or more webpages. The client can be implemented, at least in part, as an application (e.g., a plug-in application, or an stand-alone application). The application can be delivered to a respective endpoint via the webpages. The application can be downloaded (or suitably updated) before participating in the meeting. If the application is already resident on the end user's endpoint (e.g., previously downloaded, provisioned through any other type of medium (e.g., compact disk (CD))), then while attempting to participate in a virtual meeting, that application would be called to run (e.g., executed) locally on the endpoint. The endpoint 202 may initialize executing the virtual meeting application in any of a number of ways. For example, an input may be received at an icon (e.g., icon 208) to begin execution of the virtual meeting application. Alternatively, an input may be received at a link to a virtual meeting (e.g., a link in an email or calendar event). Activating the link may launch a plug-in in a web browser application, or may launch a stand-alone meeting application. In either case, the endpoint executes the virtual meeting application to establish communication with one or more servers and, thereby, join the virtual meeting.

In order to initiate joining a virtual meeting, an endpoint may connect to any point of attachment. Hence, a client (e.g., a virtual meeting client) can perform appropriate operations to join a previously scheduled virtual meeting. The endpoint can be redirected to data center meeting zone 140 (as shown in FIG. 1). The meeting zone manager 148 can direct the endpoint to connect to a specific collaboration bridge server for joining the upcoming meeting. If the meeting has VoIP/video streams, then the endpoint also connects to a given server (e.g., an MCS) to receive those streams. The client is operably connected to the meeting (i.e., has completed joining the meeting) when client connected only by voice, only by video, or by integrated voice and video. Operationally, when the client joins the virtual meeting (e.g., and launches integrated voice and video) there are two connections being established to the collaboration bridge and to the MCS. For the collaboration bridge, one connection is established to send data and a second connection is established to receive data. For the MCS, one connection is established for control and the second connection is established for data. As the meeting begins, the meeting host may initially have control of the meeting (i.e., by default). The meeting is operational between the endpoint and other endpoint devices that followed a similar initiation protocol to join the meeting.

Figure 3A:
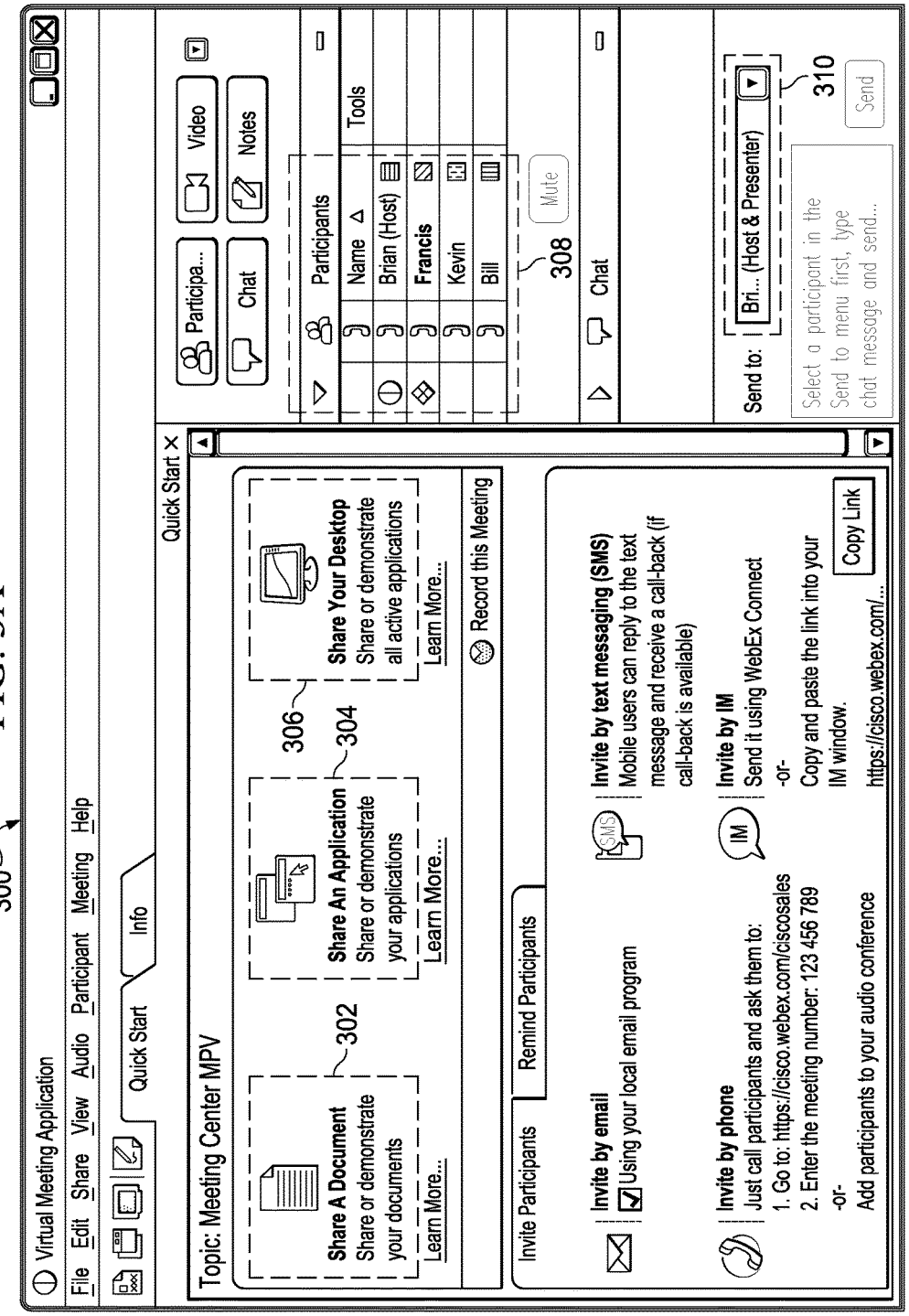
Figure 3B:
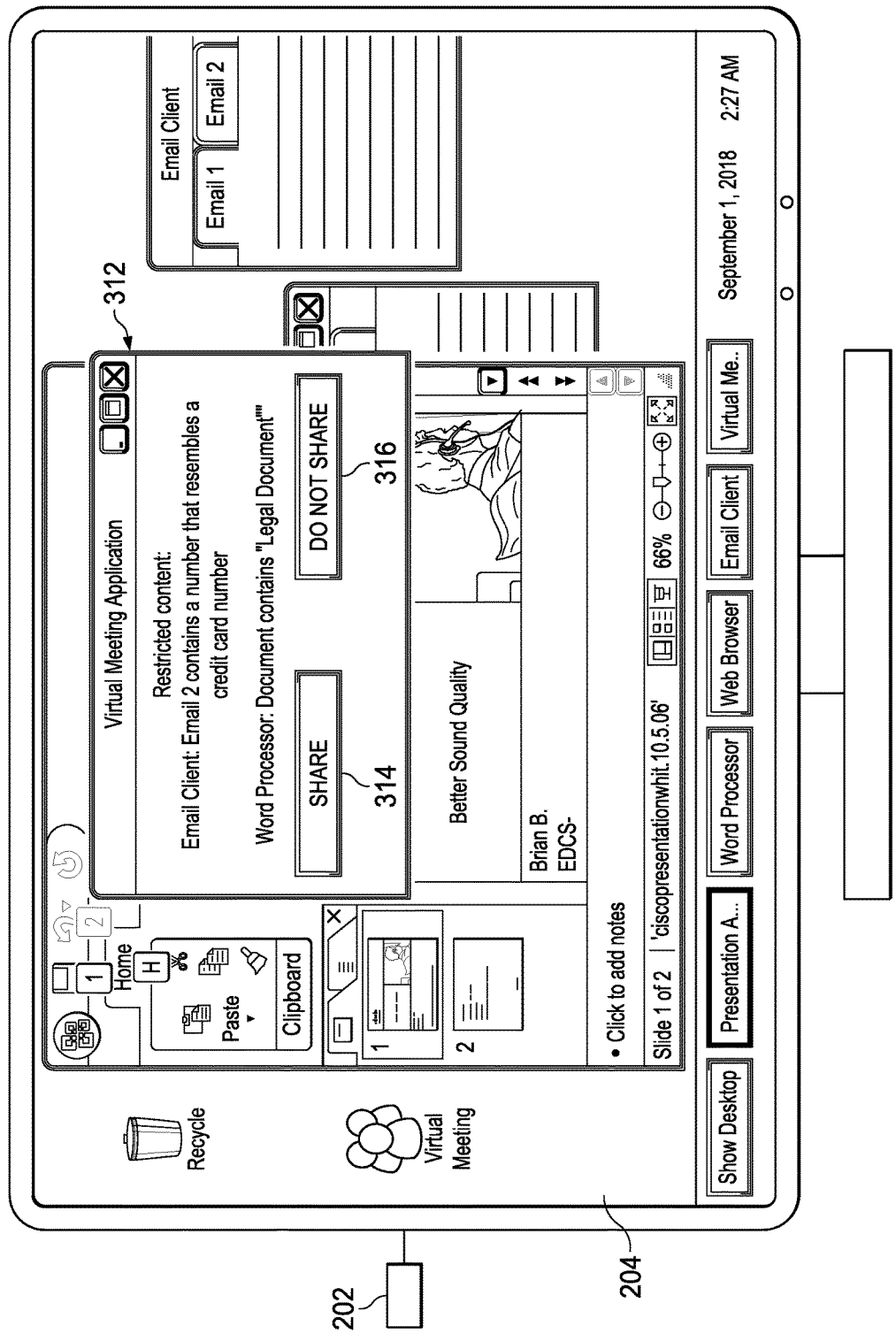
Figure 4:
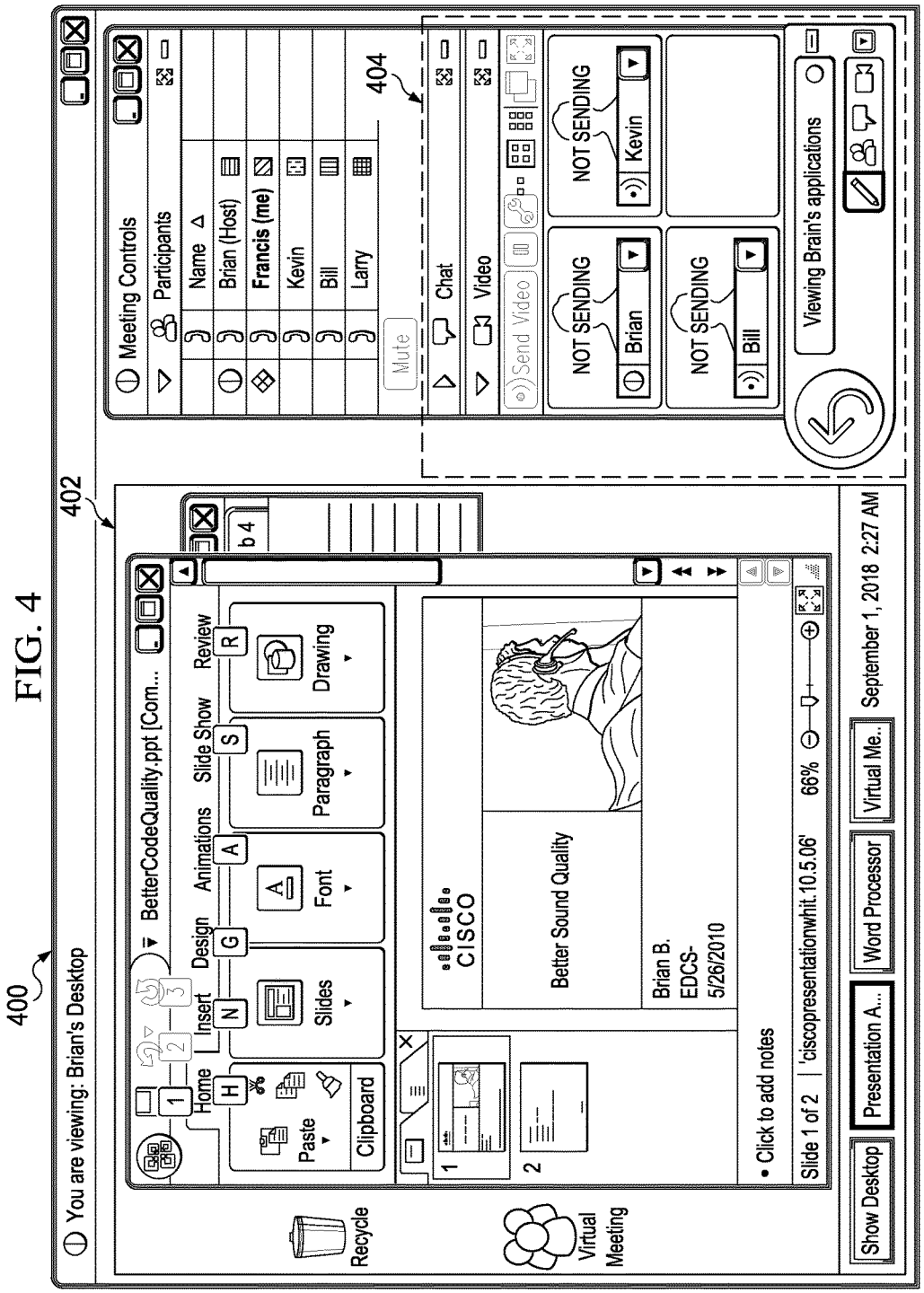

Upon executing a virtual meeting application, an endpoint may generate a user interface for the virtual meeting application. In one specific example, a user (Brian) operates an endpoint (e.g., endpoint 202) on which the virtual meeting application is running to initialize a virtual meeting. Turning to FIG. 3A, FIG. 3A is a simplified schematic diagram illustrating example user interface graphic associated with a possible implementation of communication system 100. FIG. 3A includes a window 300 corresponding to the virtual meeting application. In this example, the user Brian may use the endpoint 202 to select a link in an email that causes the virtual meeting application window 300 to be launched on desktop 204. Window 300 includes, among other things, interface components 302, 304, 306, 308 and 310. When a virtual meeting is initialized, an endpoint corresponding to a meeting host (in this case, Brian) may initially be designated as an active presenter. The active presenter has control of the meeting (i.e., by default). Only the endpoint for the active presenter may activate (or deactivate) certain controls for the virtual meeting (e.g., sharing content in the virtual meeting, recording audio or video generated in the virtual meeting, or any other administrative virtual meeting functions). Thus, only Brian's endpoint may share content. The window 300 may correspond to that generated by Brian's endpoint and, therefore, includes certain control components 302, 304, and 306. The components 302, 304, and 306 may be utilized (e.g., by a content manger module and/or endpoint) to receive an input associated with sharing data in a virtual meeting. Endpoint 202 is involved in the virtual meeting with other endpoints. The other endpoints connected to the meeting may not able to access such controls (i.e., may not have access to controls associated with 302, 304, and 306). Interface component 308 is a list of identifiers corresponding to each endpoint that is connected to the virtual meeting. In this case, each identifier is a name of a user (i.e., Brian, Francis, Kevin, Bill). The endpoints corresponding to Francis, Kevin, and Bill (i.e., the other endpoints involved in the meeting) may not be able to share content and/or access controls for sharing content in the virtual meeting. FIG. 3B illustrates other example user interface graphics that may be generated by Brian's endpoint when attempting to share content in the virtual meeting. FIG. 4 illustrates an exemplary window (window 400) that may be rendered on one or more of the other endpoints involved in the virtual meeting (e.g., rendered if Brian shared his desktop 204 in the virtual meeting). FIGS. 3B and 4 are further discussed in with respect to logic 500 of FIG. 5.

Figure 5:
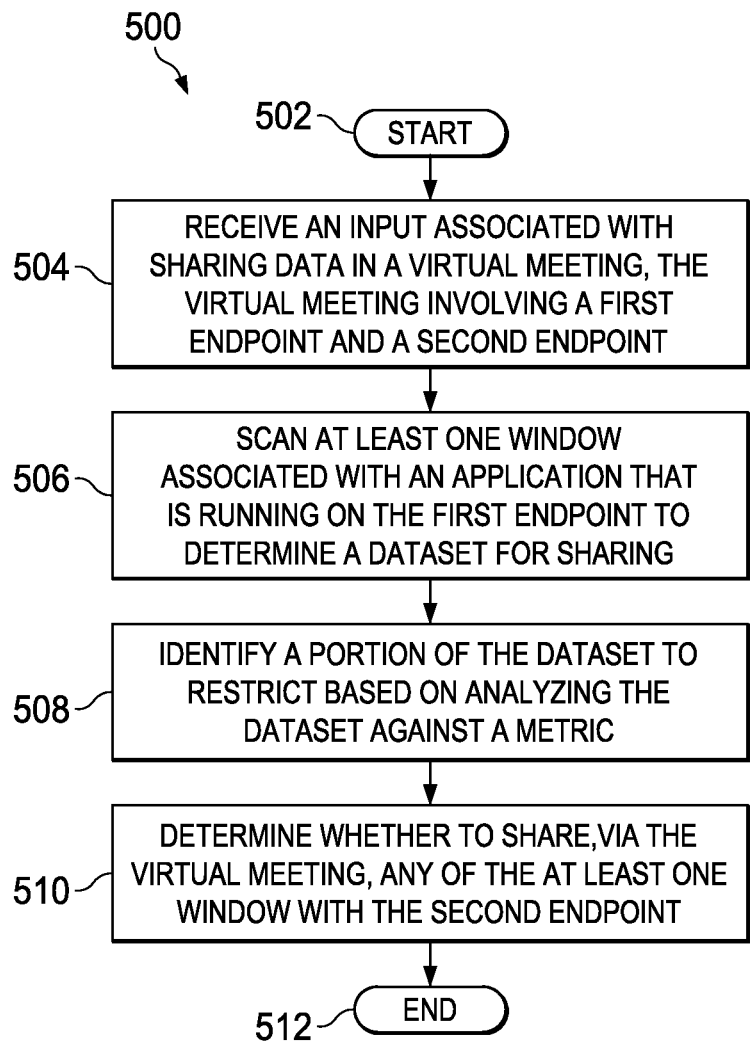
FIG. 5 is a simplified schematic diagram illustrating exemplary logic according to some embodiments of the present disclosure.

The endpoint 202 (Brian's endpoint) may implement a content manager module that includes logic for determining whether to share certain content. Turning to FIG. 5, FIG. 5 illustrates exemplary logic (logic 500) according to some embodiments of the present disclosure. Logic 500 may be implemented (and executed) by, e.g., an endpoint and/or a content manager module. Logic 500 begins at start point 502. Start point 502 may coincide with a start or end point of other logic, routines, and/or applications. In addition, at start point 502, data (e.g., objects, values, variables, etc.) may be initialized, retrieved, or accessed for use in logic 500. The logic advances from 502 to 504. At 504, an input associated with sharing data in a virtual meeting is received (e.g., by a content manger module). At 506, at least one window associated with an application that is running on the first endpoint is scanned to determine a dataset for sharing. At 508, a portion of the dataset is identified as restricted (or to be restricted) based on analyzing the dataset against a metric. At, 510 a determination is made as to whether to share, via the virtual meeting, any of the at least one window with the second endpoint. Logic 500 ends at end point 510. End point 510 may coincide with a start/end point of other logic, routines, and/or applications. What follows is a further discussion of possible details of logic 500 in the context of the example user interface graphics of FIGS. 2, 3A, 3B, and 4.

At 504, an input associated with sharing data in a virtual meeting is received (e.g., by a content manger module). The virtual meeting involves a first endpoint and a second endpoint. For example, endpoint 202 (e.g., a first endpoint) is involved in the virtual meeting with the other endpoints as described above (e.g., endpoints associated with the identifiers "Francis", "Kevin", "Bill", "Larry"). Turning to FIG. 3A, the window 300 (FIG. 3) is generated by an endpoint designated as active presenter (and/or host) and, therefore, includes interface components 302, 304, and 306 for receiving an input associated with sharing data in a virtual meeting. Each of components 302, 304, and 306 include an icon and text correspond to sharing a document, sharing an application, or sharing a desktop, respectively. Interface component 302 may receive an input (e.g., a click or other selection) associated with sharing a document in the virtual meeting. The interface component 302 is operable to initiate sharing the document (e.g., presentation document, image, text document, or any other data file) with the other endpoints in the virtual meeting. Interface component 304 may receive an input associated with sharing an application in the virtual meeting. The interface component 304 is operable to initiate sharing the application (e.g., presentation application, word processor application, web browser application, etc.) with the other endpoints in the virtual meeting. When an application is shared, the window corresponding to the application and/or the content therein is shared with the other endpoints in the virtual meeting. Interface component 306 may receive an input associated with sharing a desktop in the virtual meeting. The interface component 306 is operable to initiate sharing the desktop (e.g., desktop 204) with the other endpoints in the virtual meeting. When the desktop is shared, anything displayed on the desktop (e.g., all visible windows and content) may be shared in the virtual meeting. Interface component 310 is a drop-down menu that enables selecting an identifier for another meeting participant (i.e., and/or corresponds to an endpoint). In this case, the selection corresponds to an individual (endpoint) to whom to send a message. A similar interface component may be utilized to receive input associated with sharing data with specific endpoints.

The input may correspond to sharing (e.g., be an instruction to share) the content (e.g., by an active presenter) with all the other endpoints connected to the virtual meeting. Alternatively, the input may correspond to sharing the content with a subset of the other endpoints connected to a virtual meeting. For example, the endpoint may receive a selection of identifiers (e.g., names of users) corresponding to the subset of the other endpoints with which to share content (e.g., share using component 310). In other examples, the subset of the other endpoints may be determined based on an association to the endpoint that is initiating the sharing (e.g., where each of the other endpoints correspond to users belong to same organization as the active presenter). In such embodiments, the content is transmitted to only the subset of the other endpoints (e.g., the content is not transmitted to endpoints not in the subset or and/or are transmitted an alternate content). The subset of the other endpoints may receive updated data (e.g., text, graphical rendering of a portion of an interface running on the endpoint) that corresponding to the content. The endpoints not in the subset may receive alternate data (e.g., alternate content). The alternate data may be identified in a region of the interface in which the content (i.e., the shared content) is located but does not contain the content (e.g., a graphical rendering of the region of interface before the content was revealed and/or showing static frame of older version of the endpoint's interface). For example, such an alternate data may be a snapshot of other data or content that was displayed prior to the restricted content being displayed.

In the example of FIGS. 3A and 3B, the endpoint 202 receives, at interface component 306, an input associated with sharing the desktop 204 in the virtual meeting. The input may be received based on a selection (by Brian using an user input device) of the icon in interface component 304. In traditional systems, after a presenter selects to share content, the presenter may not have an opportunity to cancel (or otherwise stop) the process of sharing the content until after the content has already been shared with the other participants in a meeting. In contrast, the system and methods disclosed herein, before sharing content, alert a user of any potentially restricted data in the content (e.g., confidential information) and prevent sharing the content until an input is received regarding whether to share the potentially restricted data. Thus, when the input associated with sharing data in the virtual meeting is received (e.g., at 504), logic 500 may advance to 506 (e.g., and does not immediately begin the sharing).

At 506, at least one window is scanned to determine a dataset for sharing. The at least one window is associated with an application that is running on the first endpoint. An endpoint (e.g., the first endpoint) may be simultaneously executing (i.e., running) a plurality of applications. For example, in addition to executing the virtual meeting application, endpoint 202 is executing a presentation application, a word processor application, a web browser application, and an email client application (e.g., as illustrated by the windows 224, 222, and 226, and the toolbar 220 in FIG. 2). The scanning may include traversing (e.g., iteratively) windows and sub-windows (e.g., both visible and hidden) associated with each running application to access the content therein. In one example, application programming interfaces (APIs) are utilized to traverse each window and/or sub-window. The scanning may include retrieving, from an application, content from each of a plurality of windows. In addition, the scanning may utilize APIs to query each application for content, optical character recognition algorithms (e.g., OCRchie recognition algorithm, GOOGLE tesseract-ocr algorithm, feature extraction algorithms, matrix matching algorithms, etc.) to determine text located in the application windows (e.g., based on a snapshot of the contents of a window or sub-window), use common commands (e.g., copy and/or paste) to access content, and/or other any other mechanism for retrieving content from the applications, windows, and/or sub-windows. Each application may include a plurality of windows (e.g., windows launched by or as a part of the application). Each window may be visible in its entirety, invisible in its entirety, or partially visible (partially invisible) on a screen (e.g., coupled to the endpoint). For example, a window may extend beyond the screen (e.g., if located partially off screen or is too big to completely fit on a screen, such as window 226 in FIG. 2). Similarly, a content located in a window may visible in its entirety, invisible in its entirety, or partially visible (partially invisible) within the window. For example, the contents of a long document may not be sized to fit within the window all at once (e.g., document 228 in FIG. 2). Instead, the window may display a portion of the content and allow the user to navigate (within the window) to other portions of the content (e.g., by scrolling). When determining the dataset, any combination of windows (e.g., visible, invisible, or partially visible) and or contents therein (e.g., visible, invisible, or partially visible) may be scanned. For example, all windows that are associated with all applications that are that are running on the endpoint 202 may be scanned. All the windows may be scanned based on the input for sharing the desktop 204 (i.e., received at 504). In such an example, (turning to FIG. 2) each of windows 224, 222 (including sub-windows "Tab 1", "Tab 2", "Tab 3", and "Tab 4"), 226 (including sub-windows "Email 1", "Email 2", and "Email 3"), and the hidden window (i.e., correspond to the Presentation application) are scanned to determine the text located therein. In this example, the text (i.e., the dataset) may be stored in a text format (e.g., ASCII). In other examples, only visible windows are accessed. In still other examples, a plurality of hidden windows is accessed to determine the dataset. Such a traversal may occur even though an endpoint (or monitor) is not displaying the hidden windows. A user may not see content in the hidden windows (because it is not visible or displayed). While sharing their desktop, the user may reveal the hidden windows. Traversing hidden windows, prior to sharing such windows, enables identification of restricted content therein before such content is shared in a meeting. This feature of the present disclosure (and other features), reduces the likelihood of (accidentally) revealing a hidden window that contains restricted content.

A dataset for sharing in virtual environment can include text, graphics, screenshots, metadata, or any other data accessed from a process. The dataset (or a portion thereof) may be stored with an association to a window and/or process from which the dataset (or the portion) was determined. For example, text data retrieved from document 228 document-editing window 222 of the word processing application may be stored in a memory with an association to the window 222 and/or the word processing application (e.g., stored in a row of a database). The association may include a title of the window or application, a hyperlink operable to make visible the window upon receiving a selection of the hyperlink, or any other suitable link or association. The dataset may include (or be updated to include) one or more bounding boxes (e.g., coordinates for a screen or desktop) that identify (or otherwise correspond to) a region in which a portion of the data is located. For example, if the dataset contains the text "credit card", a corresponding database entry may be updated to include the text "credit card" and the coordinates (0, 1) and (30, 50) (i.e., (x, y) in pixels), which identify a region of the desktop where the text is located. The dataset may be determined from any content associated with applications running on an endpoint. The dataset may be determined by scanning the applications that are running on the endpoint. The determination may utilize application programming interfaces to query each application for content, optical character recognition algorithms to determine text in the application (or in an image), use common commands (e.g., copy and/or paste) to access content, and other any other mechanism for retrieving content from the applications. When the data set has been determined, logic 500 advances to 508.

At 508, a portion of the dataset is identified as restricted (or to be restricted) based on analyzing the dataset against a metric. Broadly speaking, at 508, a determination is made (e.g., based on one or more metrics) as to whether the dataset contains any restricted data. If the dataset does not contain any restricted data, the content (including the dataset) may be shared. If the dataset contains restricted data, a notification may be generated to alert a user. A metric may represent one or more characteristics of potentially sensitive data. The metric may be generated in various ways (e.g., manually input, retrieved from a third party, generated from a set of common keywords). In operation, the characteristics may be used as criteria against which to analyze a dataset (or a portion of the dataset). For example, the dataset may be analyzed to determine whether a portion of the dataset satisfies a metric. A portion of the dataset that meets a metric may be referred to as restricted content (or restricted data). In one specific example, if a portion of the dataset satisfies a metric (e.g., has a characteristic that matches a characteristic of potentially sensitive data), the portion may be identified as to be restricted (e.g., labeled as sensitive, confidential, or otherwise restricted). The metric may be a rule (i.e., do not share dataset if it contains word from a stored list). Such rules may be applied to prevent sharing potentially sensitive, confidential, offensive, or explicit content. In addition, the metric can be any one or more of: a text (e.g., to match to), a format (a social security number format, telephone number format, bank account number format), a function applied to a dataset, and the like. Moreover, a metric can be applied to any type of data including, e.g., text, images, data objects, user interface components, and the like.

The analysis against the metric may include analyzing: text in the dataset, a format of a portion if the dataset, a photo in the dataset, or other portions or types of data. All the windows may be scanned based on the input for sharing the desktop 204 (i.e., received at 504 in FIG. 5 or at interface component 306 in FIG. 3A). In the example of FIG. 3A, the user Brian may have made a selection of a user interface component associated with sharing his desktop (e.g., desktop 204 in FIG. 2). The dataset for desktop 204 may include text located in each of windows 224, 222 (including sub-windows "Tab 1", "Tab 2", "Tab 3", and "Tab 4"), 226 (including sub-windows "Email 1", "Email 2", and "Email 3"), and the hidden window (i.e., correspond to the Presentation application). The text is compared against metrics including, e.g.: a format of credit card number, a restricted keyword "Legal Document", a match to a cell phone number (e.g., Brian's cell phone number as retrieved from previous input). In this example, when the dataset is compared to the metrics, it is determined that: a first portion of the dataset (i.e., in Email 2 in the email client application) meets the metric for the format of credit card number; a second portion of the dataset (i.e., in document 228 in the word processor application) meets the metric for the restricted keyword "Legal Document"; and no portion of the dataset meets the metric for the match to his personal cell phone number. Thus, the first and second portions are identified as restricted content. Such identification may be added to the dataset. The first portion of the dataset may be stored with an association to Email 2 and/or the email client application. The second portion may be stored with an association to document 228 and/or the word processor application.

A notification may be generated to identify restricted content (e.g., generated by the endpoint and/or content manger module). In some cases a graphical representation of the notification (e.g., a graphical notification) is generated for display. A duration of time in which the notification is displayed may provide a user with time to close any windows that contain restricted content (e.g., and/or provide the endpoint with time to receive an input effective to close a window). The notification may also include text and/or icons (or other indicia) corresponding to the window that includes the restricted content (e.g., a title of the windows that contains the restricted content). The notification may further include an interface component (e.g., button, check box, etc.) operable to receive input for sharing content or not sharing content. In some examples, the notification includes textual instructions to close the window that contains the restricted content. Turning to FIG. 3B, the endpoint 202 generates a notification 312 based on the restricted content identified within the dataset (e.g., the first and second portions). Thus, desktop 204 has not been shared in the virtual meeting because several items (one hidden and one visible) contained restricted content. The notification 312 identifies the restricted context with the following text for the first portion of the dataset, "Email Client: Email 2 contains a number that resembles a credit card number", and following text for the second portion of the dataset "Word Processor: Document contains 'Legal Document'". Each of texts "Email 2" and "Document" identify the portion of the dataset to restrict. Each of texts "Email Client" and "Word Processor" corresponds to (and identify) the windows that include the portions of the dataset to restrict. The notification 312 also includes interface buttons 314 and 316. The button 314 includes the text "SHARE" and is operable to proceed to share the desktop 204 with other endpoints in the virtual meeting. The button 316 includes the text "DO NOT SHARE" and is operable to abandon sharing the desktop 204 (or prevent sharing) with other endpoints in the virtual meeting. In the duration of time in which the notification 312 is displayed, the user may close the email client application to avoid accidentally revealing a credit card number. In this example, the user Brian closes the email client (i.e., window 226 in FIG. 2) and then proceeds to share his desktop by selecting button 314. Thus, an input is received at button 314 to begin sharing desktop 204. In other examples, selecting button 316 may automatically close all windows associated with identified restricted content (e.g., without any further input subsequent to the selection of 316, close window 224 which corresponds to the "Word Processor" application and, within window 226, close only the sub-window titled "Email 2"). After the determination is made as to whether the dataset contains any restricted data (e.g., at 508), the logic 500 advances to 510.

At 510, a determination is made as to whether to share, via the virtual meeting, any of the at least one window with the second endpoint. The determination may be based on input received using a notification (e.g., notifications 312 (FIG. 3B), 700 (FIG. 7), 800 (FIG. 8), 900 (FIG. 9), 1000 (FIG. 10)). Because the restricted content is not shared (e.g., is paused) until after confirmation is received regarding whether to share, the restricted content is not transmitted to the other endpoints in the virtual meeting during a display of the notification. The endpoint may receive confirmation (e.g., based on an input corresponding to a confirmation, or lapsing of a duration or time) to continue sharing content or to not sharing content. If an instruction to proceed with sharing is received after the restricted content is closed, the sharing may appear seamless (e.g., as the restricted content were never visible) to other meeting participants (e.g., since they never were transmitted restricted content from the window).

At 510, when a determination is made to not share content (i.e., a portion of a dataset) from a window, the window may be prevented from being transmitted via the virtual meeting (e.g., to the second endpoint, or any other endpoint involved in the virtual meeting). In the example of FIG. 3B, such a determination may be made based on an input at button 316. For example, restricted content (e.g., identified at 508) may be looked up (e.g., in a memory containing the dataset). The lookup may be used to determine which window, of a plurality of windows (may include hidden windows) associated with an application, contains restricted content. Once the window is identified, a bounding box around the window may be determined using, e.g., operating system-level API, screen captures, etc. The bounding box may be utilized to identify a portion of the desktop to not share (e.g., not to transmit to the virtual meeting servers). A previous image of a region within the bounding box may be transmitted instead of the restricted content (e.g., an image taken of the desktop prior to the restricted content being displayed on the desktop). For such a feature, an image of the desktop may be stored at regular intervals and/or immediately preceding the display of any window on the desktop (e.g., prior to revealing a new window or a previously hidden window, and the like). In effect, an otherwise live stream of content from the endpoint may be frozen (in whole, or in part, e.g., within the bounding box) to prevent the window that includes the restricted content from being transmitted via the virtual meeting. The freezing may comprise the endpoint transmit the previous image to other users in the virtual meeting instead of the restricted content.

Figure 7:
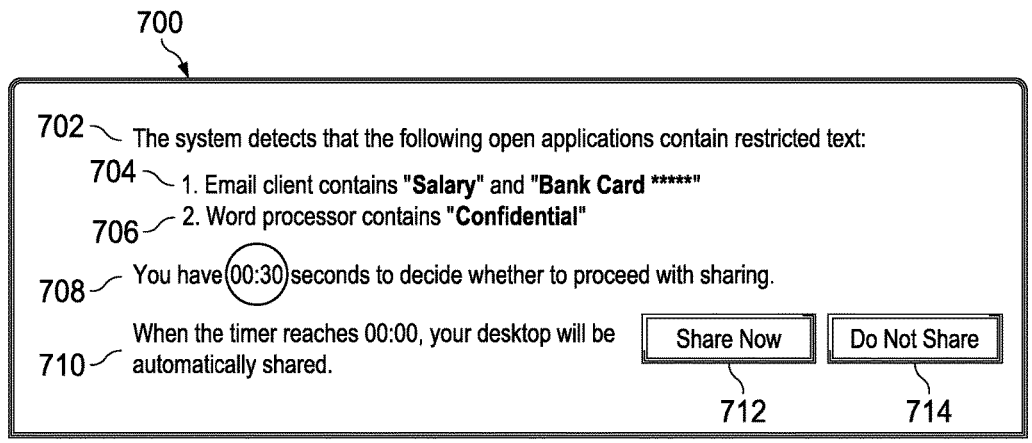
FIGS. 7, 8, 9, and 10 are simplified schematic diagrams illustrating example user interface graphics associated with possible implementations of the communication system.

The content may be prevented from being transmitted for a duration of time and/or until an input is received regarding sharing the content. The duration of time may be a predetermined duration after which an action is taken. The action may be an instruction to share or to not share the content (e.g., based on a default setting). A notification may be displayed to the user (e.g., in a graphical interface component) including a warning that the content is potentially sensitive and/or including a countdown clock. The duration of time may be a constant value regardless of content (e.g., 30 seconds, 10 seconds, etc.) or may vary based on the content (e.g., where longer content corresponds to longer duration of time to allow for review of the content). Turning to FIG. 7, FIG. 7 is a simplified schematic diagram illustrating example user interface graphics associated with a notification. Notification 700 includes indicia 702, 704, 706, 708, and 710, and interface buttons 712 and 714. Indicia 704 and 706 identify restricted content and an application that contains the content. Indicia 708 include a countdown timer that indicates a duration of time when the content will not be shared. Once the duration expires (e.g., reaches zero), the content may be automatically (e.g., without further user input in a notification) shared or not shared. In the example of notification 700, the content is shared when the duration of time expires. Interface buttons 712 and 714 may operate in a manner similar to interface buttons 314 and 316 (FIG. 3B).

At 510, when a determination is made to share content from a window, the window (e.g., the widow, a rendering of the window, image of the window, or other representation thereof) may be shared with other endpoints that are in the virtual meeting. In the example of FIG. 3B, such a determination may be made based on receiving an input at button 314. In this example scenario, a particular meeting participant (Brian) shares a presentation application on his desktop 204 (FIG. 2) during a virtual meeting. Turning to FIG. 4, FIG. 4 illustrates an exemplary window (window 400) that may be displayed on one of the other endpoints (i.e., other than Brian's endpoint, e.g., Francis' endpoint) if Brian shared desktop 204 in the virtual meeting. Brian's endpoint can freely share the desktop such that other meeting participants can observe information that is resident locally on the endpoint. Window 400 includes, among other things, shared content 402, and chat component 404. The chat component 404 allows the endpoint to receive messages from and to transmit messages to other endpoints in the virtual meeting. The shared content 402 shows a graphical representation of desktop 204 (FIG. 2) as received from endpoint 202 (e.g., Brian's endpoint). The shared content 402 may be streamed from the endpoint 202 to the virtual meeting servers (e.g., located in 130 and/or 140). The meeting servers may be streamed the shared content 402 to each of the respective endpoints in the virtual meeting. Note that before the content was streamed to this window 700, the endpoint 202 closed window 226 (i.e., in FIG. 2) to prevent sharing the credit card number (i.e., as identified notification 312 in FIG. 3B).

Content may be shared (e.g., based on the determination at 510) in a virtual meting using any one or more of several techniques. For example, the shared content (and/or a graphical representation of the content) may be transmitted from an endpoint to one or more servers (e.g., virtual meeting servers). An application (e.g., virtual meeting application or any other application that can share content) on the device may receive an input that indicates an instruction to share content. Upon receiving the instruction, the application may execute the instruction to share content. Executing the instruction may cause the application (and/or the device on which the application is running) to transmit the content to the one or more server. The one or more servers receive the content (and/or a graphical representation of the content). In turn, the one or more servers transmit the content (and/or a graphical representation of the content) to endpoints connected to the virtual meeting (i.e., participants). When sharing a desktop (e.g., based on receiving a selection at 306 in FIG. 3A), a virtual meeting application (and/or content manager module) may create a sharing session with the one or more servers for transmitting a of (live) stream desktop data to the endpoints connected to the virtual meeting. When sharing an application desktop (e.g., based on receiving a selection at 304 in FIG. 3A), a selection may identify a particular application from a plurality of applications running on the endpoint. A virtual meeting application (and/or content manager module) may create a sharing session with the one or more server for transmitting a (live) stream of application data from the particular application to the endpoints connected to the virtual meeting. When sharing a document (e.g., based on receiving a selection at 302 in FIG. 3A), a selection of a particular document in a local folder may be received. A virtual meeting application (and/ or content manager module) may load the particular document and translate the document to image data. The virtual meeting application may transmit the image data to the endpoints involved in the virtual meeting. If the content is to be shared with all meeting participants, then the content may be transmitted (e.g., via the one or more servers) to all the other endpoints connected to the virtual meeting. Alternatively, If the content is to be shared with subset of other endpoints connected to the virtual meeting, then only the subset of other endpoints are transmitted the content (e.g., endpoints not in the subset do not receive the content or receive and alternate content). The subset of endpoints may receive updated streaming data (e.g., text, graphical rendering of a portion of an interface running on the endpoint) that corresponding to the content. The endpoints not in the subset may receive alternate data that corresponds to a region of the interface in which the content is located but does not contain the content (e.g., a graphical rendering of the region of interface before the content was revealed and/or showing static frame of older version of the endpoint's interface). After a determination is made as to whether to share, via the virtual meeting, the content, the logic 500 may advance to 512 where it may terminate, iterate, or call other logic.

Figure 6:
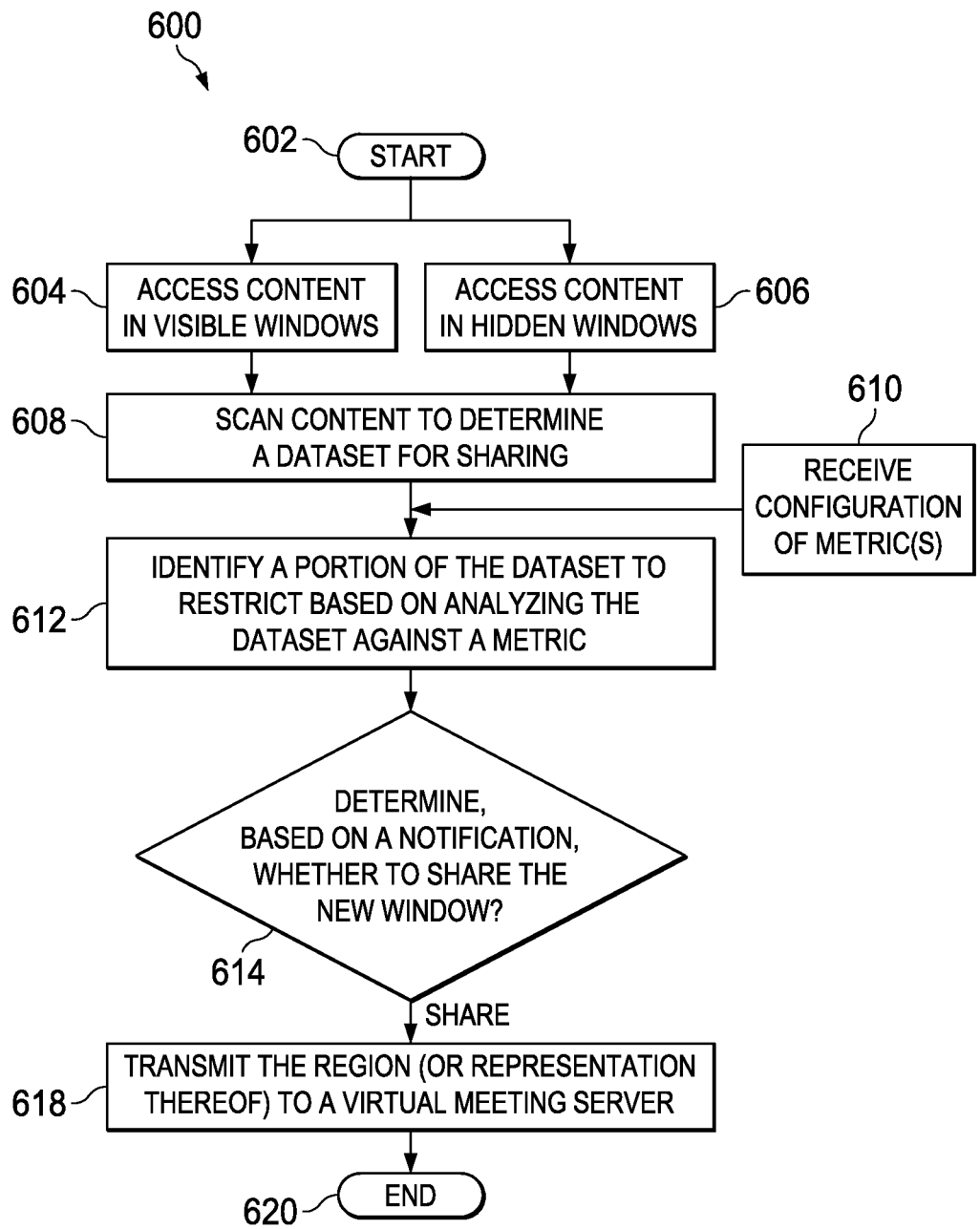
FIG. 6 is a simplified schematic diagram illustrating another exemplary logic for some embodiments of the present disclosure.

Turning to FIG. 6, FIG. 6 illustrates another exemplary logic (logic 600) according to some embodiments of the present disclosure. Logic 600 may be implemented (and executed) by, e.g., an endpoint and/or a content manager module. Logic 600 begins at 602 and advances to 604 and 606 where content in various windows is accessed. At 604, content in visible windows is accessed. The visible windows may be those that are visible (or partially visible) on a desktop (e.g., desktop 204). At 606, content in hidden windows is accesses (e.g., by a content manager module). The hidden windows may be those that are invisible (or partially invisible) on a desktop (e.g., desktop 204). When content from visible windows and invisible windows has been accessed (and stored in a cache or other memory element), the logic 600 advances to 608. At 608, the accessed content is scanned to determine a dataset for sharing. The content may be accessed (e.g., at 604 and/or 606) and scanned (e.g., at 608) using techniques similar to those described with respect to FIG. 5 (e.g., at 506). In some examples, the hidden windows are accessed and scanned using one set of techniques (e.g., screenshot and OCR algorithms) while the hidden windows are accessed using a different set of techniques (e.g., APIs to traverse windows and automatically copy/paste content therein). After the dataset is determined, configuration of one or more metrics is received at 610. The metrics may be received from a local file on the implementing endpoint or may be received from a remote source. The configuration may include modifications the one or more metrics or selections of a subset of the one or more metrics to utilize in an analysis. At 612, a portion of the dataset is identified as a restricted content based on analyzing the dataset against a metric in the one or more metrics. The portion of the dataset may be identified (at 612) and using techniques similar to those described with respect to FIG. 5 (e.g., at 508). At 614, a determination is made, based on a notification, whether to share content. The determination may be made and using techniques similar to those described with respect to FIG. 5 (e.g., at 510). When a determination is made to share content (e.g., restricted content), logic 600 advances to 616 where the content (or representation thereof) is transmitted to a virtual meeting server. When a determination is made to not share content, the content is not shared and logic 600 advances to 620, where the logic 600 may terminate, iterate, or call other logic.

Figure 8:
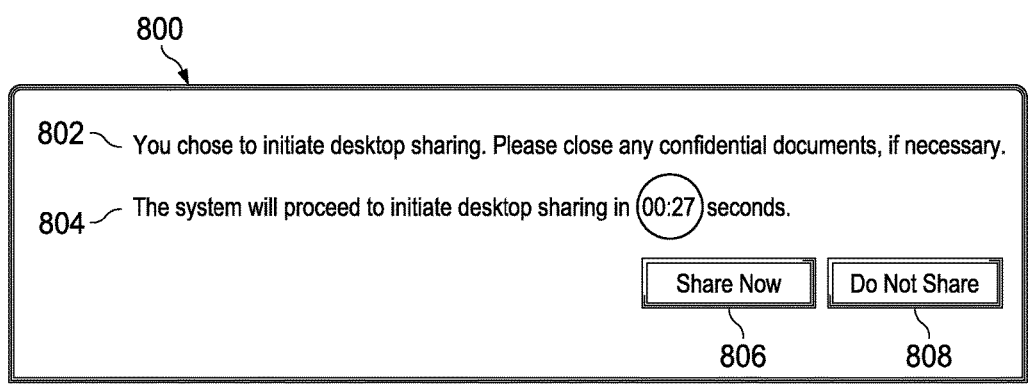

FIG. 8 is a simplified schematic diagram illustrating example user interface graphics associated with an alternate notification (notification 800). An endpoint may generate notification 800 prior to sharing content in a virtual meeting and may suspend any pending sharing of content while the notification is displayed. In a particular example, endpoint 202 generates notification 800 in place of notification 312. Notification 800 may be generated on an endpoint preceding sharing content. Notification 800 includes indicia 802 and 804, and interface buttons 806 and 808. Indicia 802 indicate, among other things, that restricted content was identified. Indicia 804 identify a remaining duration of time (using a countdown timer) during which the shared data stream is delayed (or paused). The countdown timer is counting from a starting time of 30 seconds down toward zero seconds. The countdown timer is shown in FIG. 8 in a state where the timer has counted down three seconds (from 30) to reach 27 seconds. When the countdown timer reaches zero seconds, the content may be automatically (e.g., without any further input from the user and/or the endpoint) shared with other endpoints involved in the virtual meeting. In this example, instead of scanning the text (e.g., using a content manager module), a shared data stream may be delayed (or paused) for a duration of time to allow a user to manually view content in each window. The notification 800 is displayed while the sharing is delayed (e.g., within the duration of time). At the end of the duration of time (as indicated by timer in indicia 804), or when user selects to share the content (button 712), the content may be transmitted to the virtual meeting servers for sharing in the meeting. Interface buttons 806 and 808 may operate in a manner similar to interface buttons 314 and 316 respectively.

Figure 9:
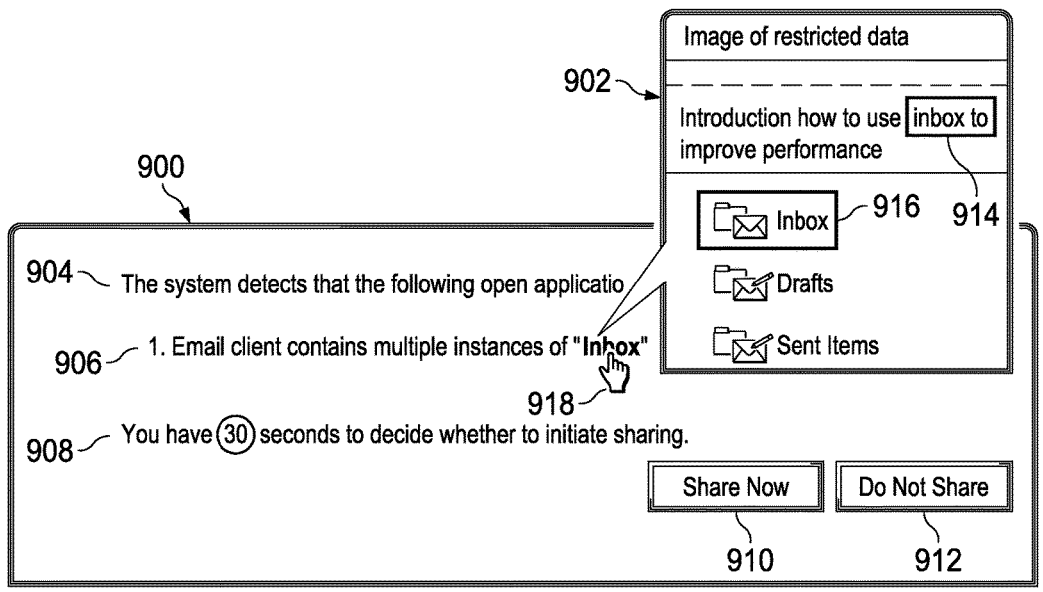
Figure 10:
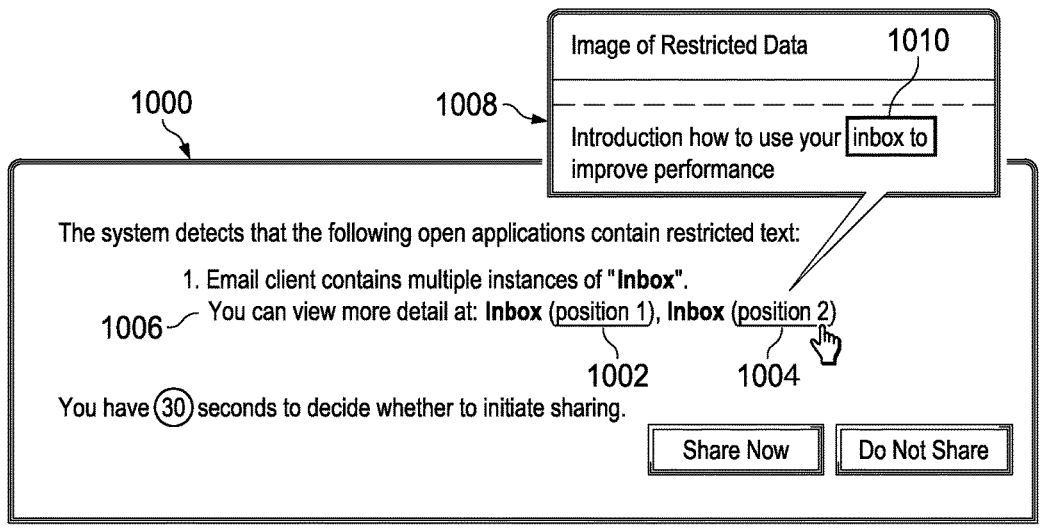

In some cases, a dataset may contain a portion that meets a metric for restricting the data (e.g., restricted and/or confidential content) but the user still wishes to share the portion. For example, if a user would like to keep content related to their inbox from being shared in a virtual meeting, they may add a metric for this by adding the word "inbox" to a list of words to be excluded from sharing. Based on such a metric, a content manager module may prevent sharing a window that includes the text "inbox". However, a challenge is to determine whether and/or when to allow restricted content to be shared (e.g., to identify false positives). In one example, an email and scheduling application meets the metric based on including text that matches "inbox". In the example of FIGS. 9 and 10, two instances of "inbox" are located in the application: a first is a name of a folder called "Inbox" and a second is a title of a meeting regarding an introduction on how to use an "inbox" to improve performance. The first may be confidential while the second may not be confidential (i.e., although it includes an instances of the text "inbox"). The notifications in each of FIGS. 9 and 10 are operable to generate an image of the content in which the text "inbox" appears.

Turning to FIG. 9, FIG. 9 illustrates notification 900, which may be displayed while sharing of data is paused in a virtual meeting. Notification 900 includes, among other things, an image 902; indicia 904, 906, and 908; and interface buttons 910 and 912. Indicia 904 identify include the text "The system detects that the following open applications contain restricted text". The indicia 904 identifies that a determination has been made that a portion of a shared dataset contains restricted content. Indicia 906 identify restricted content and an application in which the restricted content is located. Indicia 908 include a countdown timer that indicates a duration of time during which the content will not be shared. Once the duration expires (e.g., reaches zero) and no input has been received, the content may be not shared (e.g., default behavior is to not share the content if no input is received at 910 or 912). In this example, the image 902 is rendered in response to an input that is received at a portion of the indicia 906 (i.e., at "in box"). The image 902 is an image of a region of the window in which "In box" is located, as it appears in the window (e.g., in this case a window corresponding to the email client, such as window 226 in FIG. 2). In this case, the input includes a pointer object 918 being hovered over the identification of the restricted content. The pointer 918 corresponds to signals received from a user input device such as a mouse or touchscreen. When the pointer object is hovered over the text "In box" the image 902 may be generated in a window and may pop up on the endpoint. Because the image 902 illustrates a context in which the restricted content appears, a user can utilize the image to distinguish between multiple instances of the same restricted content. The image 902 contains two images of different instances of "Inbox" (i.e., a horizontal line separates the two images). The image 902 further includes bounding boxes 914 and 916, which highlight the location of the restricted content.

Turning to FIG. 10, FIG. 10 illustrates notification 1000, which may be displayed while sharing of data is paused in a virtual meeting. Notification 1000 includes, among other things, indicia 1002, 1004, and 1006. Various indicia and buttons in notification 1000 are similar to those in notification 900 (FIG. 9) and are not repeated here only for the purpose of brevity. The indicia 1006 identify a plurality of instances of restricted content. The indicia 1006 include two hyperlinks 1002 and 1004. Hyperlink 1002 corresponds to a first location at which the restricted content is located. Hyperlink 1004 corresponds to a second location at which the restricted content is located. In the example of FIG. 10, when an input is received at either of the hyperlinks 1002 or 1004, an image corresponding to the location is generated for display and may pop up on the endpoint. For example, when a cursor selects hyperlink 1004 (i.e., an input is received at the hyperlink 1004), the endpoint renders an image 1008 of the region of a window in which the restricted content is included. A corresponding image is generated when an input is received at the hyperlink 1002. In this example, the input includes a pointer object being used to select either of hyperlinks 1002 or 1004, each of which correspond to an instance of the restricted content. This allows a user to easily view the context in which the restricted content appears and to distinguish between multiple instances of the same restricted content.

To render the images (e.g., as illustrated by images 902 and 1008 in FIGS. 9 and 10 respectively), coordinates defining a bounding box that envelopes the restricted content may be stored with an associated to the dataset (e.g., by a content manager module). A notification may generate a display of a region around the confidential information (e.g., using the coordinates of the bounding box). The bounding box may be used to capture an image of restricted content. For example, when capturing the image of the content, the bounding box may be used with an offset (e.g., a number of pixels) to capture the context in which the confidential information is located. In addition, the bounding box may be used to highlight the confidential content within the image (e.g., by placing a colored box around the content), such as boxes 914 and 916 (FIG. 9), and 1010 (FIG. 10).

The system and methods disclosed herein address a challenge regarding unexpectedly displayed content, which may be confidential, in the context of a virtual meeting. For example, a pop-up window corresponding to a reminder for a personal event, an instant message window, or any other event notifications may cause confidential or sensitive information to be displayed on an endpoint. If any such event notifications are received while an endpoint is sharing content (e.g., desktop sharing) in a virtual meeting, it may result in the confidential or sensitive information being shared with other endpoints in the virtual meeting. For example, an endpoint (e.g., designated as active presenter) may be sharing content in a virtual meeting and receive an instant message that includes keywords that trigger a confidentiality metric. Preventing sharing a window that unexpectedly displays restricted content is a challenge. Some systems may share a window that contains confidential content by obscuring (e.g., applying a mask to) the confidential portions of the content. Such a mask may be applied to content displayed on other endpoints involved in the virtual meeting, the mask may not be displayed to the endpoint designated as the active presenter. This may leave the active presenter unsure of whether the confidential information was sent to other meeting participants. To address these (and other) challenges, the systems and methods herein can prevent sharing the entire contents of a window based on a portion of the content in the window being confidential. If a window contains restricted content, some other systems may share a censored version of the window's content. In contrast, if a window contains restricted content, the systems and methods herein may share none of the window's content.

Figure 11:
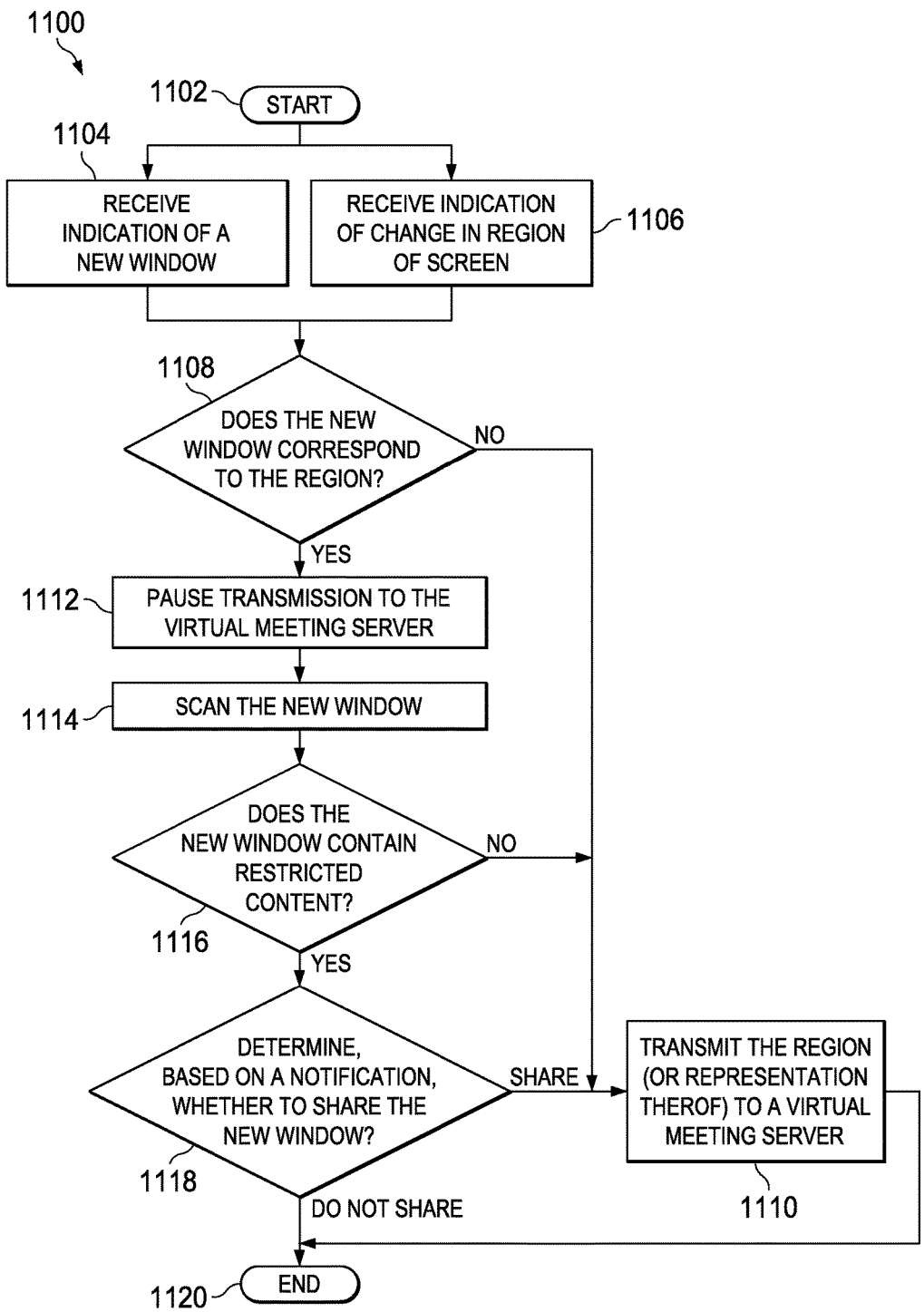
FIG. 11 is a simplified schematic diagram illustrating still other exemplary logic for some embodiments of the present disclosure.
Figure 12:
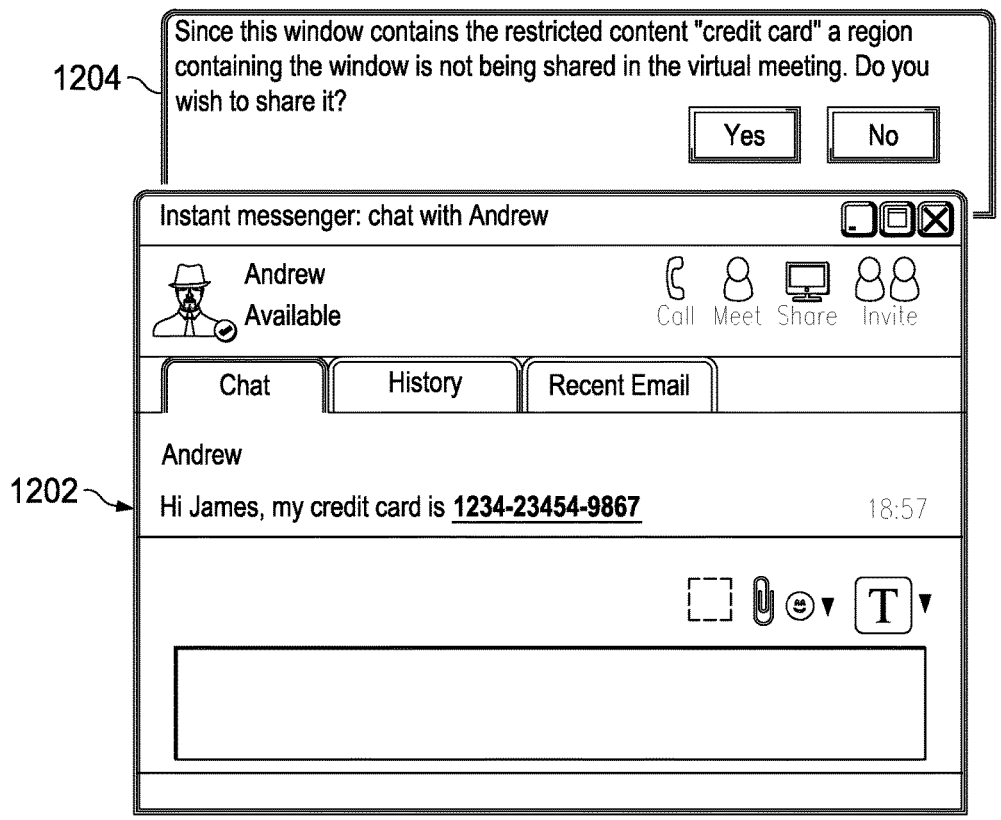
FIG. 12 is a simplified schematic diagram illustrating example user interface graphics associated with possible implementations of the communication system.

FIG. 11 illustrates another exemplary logic (logic 1100) according to some embodiments of the present disclosure. FIG. 12 illustrates another exemplary notification (notification 1204) according to some embodiments. The logic 1100 and/or the notification 1204 address the above challenges regarding unexpectedly displayed content (and other challenges). Turning to FIG. 11, logic 1100 may be implemented (and executed) by, e.g., an endpoint and/or a content manager module. Logic 1100 begins at 1102, where an endpoint may already be connected to a virtual meeting and also sharing content (e.g., a desktop data stream, any or other content) in the virtual meeting. When the endpoint is sharing the content, the logic 1100 advances to 1104 and/or 1106.

At 1104, an indication of a new window is received. In some cases, creation of (and/or display of) a new window (e.g., pop-up and/or event notification) may be detected on an endpoint designated as the active presenter based on the indication. The indication may be message from an event listener thread (i.e., process) running on the endpoint. For example, the message may include the identity of the application that generated the new window and or the identity of the window (e.g., name, hyperlink, any other identifier, etc.). In other examples, the indication is received based on detecting, using image processing, a visual change in the desktop and/or toolbar of the endpoint. In still other examples, an API may be used to poll an operating system for a list of active windows and compare a current version of the list to a past version of the list (e.g., any windows in the current version that are not in the past version are new windows).

At 1106, an indication of a change in a region of the screen is received. The indication at 1106 may be received using techniques similar to those described for 1104. For example, an event listener may also include, in the message, coordinates that define a bounding box of the new window. When using image processing, a visual change in the desktop or toolbar and/or the endpoint may be detected by comparing a previous image of the desktop with a current version of the desktop to identify a region of any visual changes. In other examples, the API used to poll the operating system may include functions operable to retrieve coordinates that define the new window (e.g., coordinates that a bounding box around the new window). A region (e.g., defined by coordinates corresponding to boundaries of the region) may be used to indicate a change in content on in a display (e.g., monitor and/or desktop).

At 1108, a determination is made as to whether the new window corresponds to the region. The determination may be based on comparing a region corresponding to the new window (new region) to the region corresponding to the change (change region). If it is determined that the new window does not correspond to the region (e.g., the new region does not correspond to the change region), the region (or representation thereof) is transmitted to a virtual meeting server at 1110. This represents a case where a new window has been created but is not visible on the endpoint. Since the content is not visible (e.g., the new window is hidden), the logic may advance to 1110 where the region (i.e., the new window) is shared with other endpoints via the virtual meeting. In other examples, upon making such a determination (i.e., that new window is hidden), logic 500 (and/or logic 600) may be executed to scan the new (hidden) window. If it is determined that the new window corresponds to the region, logic 1100 advances to 1112 to pause the transmission of content.

At 1110, the region may be transmitted to a virtual meeting server. The transmission is effective to share the content, contained in the region, with other endpoints in the virtual meeting. The transmission may comprise streaming data to one or more servers, which, in turn, transmit the data to the other endpoints involved in the virtual meeting.

At 1112, transmission of content (e.g., a data stream) to the virtual meeting server may be paused (in whole or in part). Pausing the transmission of the content is effective to prevent endpoints from being transmitted at least the content in the region. For example, the endpoint may transmit alternative content (e.g., a last frame that preceded the new window content) instead of the content. The alternative content may be transmitted to the other endpoints instead of the content in the new window. The alternative content may be based on a stored representation (e.g., screenshot) of content that was being generated for display (or displayed) prior to the display of the new window. The representation may contain only a portion of the screen that is affected by displaying the new window (e.g., a region of the screen that the new will occupy once displayed). Alternatively, the representation may contain the entire contents (e.g., all visible content) of the screen prior to displaying the new window. In some embodiments, the alternate content is a same frame (e.g., a last frame that was transmitted before the new window was generated) that is continuously transmitted to the other endpoints in the virtual meeting. In such an example, the same frame is used as a freeze-frame in a sharing data stream and is operable to create a visual effect of "pausing" a portion of the screen at the same frame. The transmission may remain paused while a determination is made (e.g., by the content manger module) as to whether content in the new window contains restricted content (e.g., based on a metric). When the transmission is paused, the logic advances to 1114. At 1114, the new window is scanned to determine a dataset (e.g., using logic as described with respect to 506 in FIG. 5). Subsequent to the new window being scanned, the logic 1100 advances to 1116.

At 1116, a determination is made as to whether the new window contains restricted content (e.g., based on the determined a dataset for the new window). The determination may be made using logic as described with respect to FIG. 5 (e.g., 508) to identify a portion of the dataset. When it is determined that the new window does not contain restricted content, logic 1100 advances to 1110 where the region (i.e., the new window) is shared. When it is determined that the new window contains restricted content, logic 1100 advances to 1118 to generate a notification.

At 1118, a determination is made, based on a notification, as to whether to share the new window. The notification may be similar to any of notifications 312 (FIG. 3B), 700 (FIG. 7), 800 (FIG. 8), 900 (FIG. 9), 1000 (FIG. 10). FIG. 12 illustrates another exemplary notification (notification 1204) according to some embodiments. In this case, a user "James" receives an instant message from a user Andrew in a new window 1202. The instant message includes a credit card number and the term "credit card" (e.g., either or both of which may be restricted content based on a metric). The window 1202 is a new window is generated, e.g., by James's endpoint during desktop sharing in the virtual meeting. Thus, the content of window 1202 could potently expose the restricted content to other endpoints in the virtual meeting. However, the window 1202 is not shared. Instead, a region in which the window 1202 would be displayed is paused with respect to the content shared in the meeting (e.g., using logic at 1112). The notification 1204 is generated on James's endpoint and not on the other endpoints in the meeting. In this example, the notification is directly attached to the window to which it relates. The notification identifies the restricted content as being the text "1234-23454-9867". In addition, the notification indicates that the content has not been shared. The interface buttons titled "YES" and "NO" in notification 1204 may operate in a manner similar to interface buttons 314 and 316 respectively and, therefore, are operable to receive input corresponding to whether to share the window 1202. When the endpoint receives an input at the button titled "YES", a determination is made to share the new window, the logic 1100 advances to 1110 where new window is shared. When a determination is made to not share the new window, the new window is not shared. Note that since the content of the new window is paused at 1112, no further action is needed to prevent sharing the new window. After the new window (and/or the region corresponding to the new window) are transmitted to the servers (e.g., at 1110) or after the new window are prevented from being shared, the logic 1100 advances to 1120 where logic 1100 may terminate, iterate, or call other logic. In some examples, the determination (at 1118) is made using logic as described with respect to 510 in FIG. 5.

Figure 13:
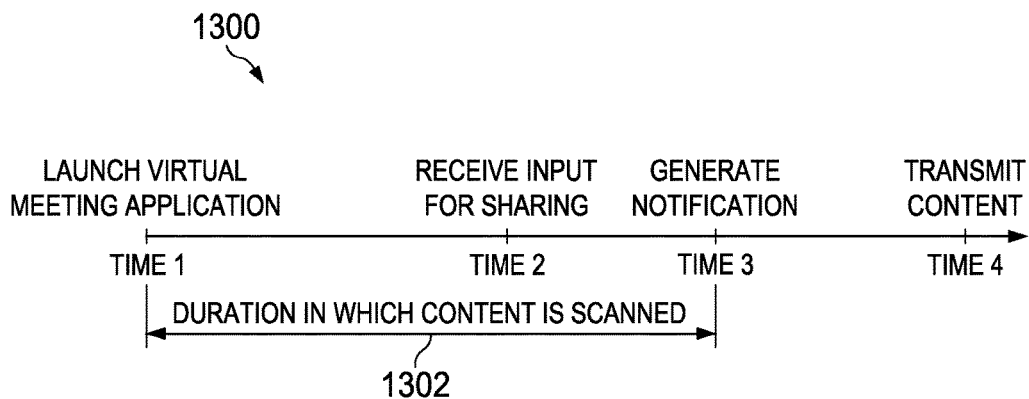
FIG. 13 is a diagram illustrating an example timeline associated with some embodiments of the present disclosure.

FIG. 13 is a diagram illustrating an example timeline (1300) associated with some embodiments of the present disclosure. The timeline illustrates an example implementation to address a challenge related to latency of determining a dataset. In this example, latency may relate to a time period beginning when an input is received to share content and ending when restricted content is identified (if applicable). The technology used to determine the dataset may have a large impact on latency due to the time required to scan a plurality of windows. For example, some scanning techniques may take longer than others. To improve the latency, the scanning of windows may begin immediately upon a virtual meeting application being activated (e.g., as opposed to waiting until a selection is made to share content. In timeline 1300, the virtual meeting application is launched at time 1. Thus the scanning commences at time 1 although the user has not selected to share content and has only launched the virtual meeting application. At time 2 (subsequent to time 1), an input is received that instructs an endpoint to initiate sharing content. A content sharing stream is delayed to allow the scanning to proceed to completion. Between time 2 and time 3, the scanning completes and the dataset is determined for comparison to a metric. At time 3, a notification is generated to display a result of the comparison. If it is determined that the content should still be shared (e.g., based on an additional input received via the notification) then the content is shared at time 4. Thus, latency related to scanning the windows is buffered from the user by beginning the scanning before receiving an input instructing sharing content.

FIG. 14 is a simplified block diagram illustrating one possible example of infrastructure associated with communication system 100. Each of endpoints 112*a-e* are provisioned with a respective content manager module 82*a-e*, a respective processor 84*a-e*, a respective memory element 86*a-e*, a respective virtual meeting module 90*a-e* (e.g., a virtual meeting application), a respective Meeting Place module 92*a-e*, and a respective network interface 88*a-e*, which includes a respective receiving module and a respective transmitting module for exchanging data (e.g., for exchanging packets in a network environment). Endpoint 112*e* also includes a telephony module for communicating with telephony network 122. Additionally, FIG. 14 illustrates an example implementation of MCSs/MCC 144 that is similarly provisioned with a content manager module 82*f*, a processor 84*f*, and a memory element 86*f*.

In one example implementation, each endpoint 112*a-e* and/or MCSs/MCC 144 includes software (e.g., as part of content manager modules 82*a-e*) to achieve or to support the content management functions, as outlined herein in this document. In other embodiments, this feature may be provided externally to any of the aforementioned elements, or included in some other network element to achieve this intended functionality. Alternatively, several elements may include software (or reciprocating software) that can coordinate in order to achieve the operations, as outlined herein. In still other embodiments, any of the devices of the Figures may include any suitable algorithms, hardware, software, components, modules, interfaces, or objects that facilitate these content management operations.

It is imperative to note that FIG. 14 is indicative of just one, of the multitude, of example implementations of communication system 100. Any of the modules or elements within endpoints 112*a-e* and/or MCSs/MCC 144 may readily be replaced, substituted, or eliminated based on particular needs. Furthermore, although described with reference to particular scenarios, where a given module (e.g., virtual meeting modules 90*a-e*, Meeting Place modules 92*a-e*, content manager modules 82*a-e*, etc.) is provided within endpoints 112*a-e* or MCSs/MCC 144, any one or more of these elements can be provided externally, or consolidated and/or combined in any suitable fashion. In certain instances, certain elements may be provided in a single proprietary module, device, unit, etc. in order to achieve the teachings of the present disclosure.

Endpoints 112*a-e* are representative of any type of client or user wishing to participate in a meeting session in communication system 100 (e.g., or in any other virtual platform or online platform). Furthermore, endpoints 112a-e can be associated with individuals, clients, customers, or end users wishing to participate in a meeting session in communication system 100 via some network. The term 'endpoint' is inclusive of devices used to initiate a communication, such as a computer, a personal digital assistant (PDA), a laptop or electronic notebook, a cellular telephone of any kind (e.g., an IPHONE, a BLACKBERRY, a GOOGLE DROID), an IP phone, a tablet (e.g., an IPAD), or any other device, component, element, or object capable of initiating voice, audio, video, media, and/or data exchanges within communication system 100. Endpoints 112a-e may also be inclusive of a suitable interface to the human user, such as a microphone, a display, a touchscreen, or a keyboard or other terminal equipment. Endpoints 112a-e may also be any device that seeks to initiate a communication on behalf of another entity or element, such as a program, a proprietary conferencing device, a database, or any other component, device, element, or object capable of initiating an exchange within communication system 100. Data, as used herein in this document, refers to any type of numeric, voice, video, media, or script data, or any type of source or object code, or any other suitable information in any appropriate format that may be communicated from one point to another.

MCSs/MCC 144 and web servers 132 are network elements that manage (or that cooperate with each other in order to manage) aspects of a meeting session. As used herein in this Specification, the term 'network element' is meant to encompass any type of servers (e.g., a video server, a web server, etc.), routers, switches, gateways, bridges, load balancers, firewalls, inline service nodes, proxies, network appliances, processors, modules, or any other suitable device, component, element, or object operable to exchange information in a network environment. This network element may include any suitable hardware, software, components, modules, interfaces, or objects that facilitate the operations thereof. This may be inclusive of appropriate algorithms and communication protocols that allow for the effective exchange (reception and/or transmission) of data or information. In one particular example, MCSs/MCC 144 and web servers 132 are servers that can interact with each other via the networks of FIG. 1.

Intranet 120, telephony network 122, and Internet 124 represent a series of points or nodes of interconnected communication paths for receiving and transmitting packets of information that propagate through communication system 100. These networks may offer connectivity to any of the devices or endpoints of FIG. 1. Moreover, Intranet 120, telephony network 122, and Internet 124 offer a communicative interface between sites (and/or participants, rooms, etc.) and may be any local area network (LAN), wireless LAN (WLAN), metropolitan area network (MAN), wide area network (WAN), extranet, Intranet, virtual private network (VPN), virtual LAN (VLAN), or any other appropriate architecture or system that facilitates communications in a network environment.

Intranet 120, telephony network 122, and Internet 124 can support a transmission control protocol (TCP)/IP, or a user datagram protocol (UDP)/IP in particular embodiments of the present disclosure; however, Intranet 120, telephony network 122, and Internet 124 may alternatively implement any other suitable communication protocol for transmitting and receiving data packets within communication system 100. Note also that Intranet 120, telephony network 122, and Internet 124 can accommodate any number of ancillary activities, which can accompany a meeting session. This network connectivity can facilitate all informational exchanges (e.g., notes, virtual whiteboards, PowerPoint presentations, e-mailing, word-processing applications, etc.). Along similar reasoning, Intranet 120, telephony network 122, and Internet 124 can foster all such communications and, further, be replaced by any suitable network components for facilitating the propagation of data between participants in a conferencing session.

It should also be noted that endpoints 112a-e and MCSs/MCC 144 may share (or coordinate) certain processing operations. Using a similar rationale, their respective memory elements may store, maintain, and/or update data in any number of possible manners. Additionally, any of the illustrated memory elements or processors may be removed, or otherwise consolidated such that a single processor and a single memory location is responsible for certain activities associated with content management operations as disclosed herein. In a general sense, the arrangement depicted in FIG. 14 may be more logical in its representations, whereas a physical architecture may include various permutations/combinations/hybrids of these elements.

Note that in certain example implementations, the content management functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element (as shown in FIG. 14) can store data used for the operations described herein. This includes the memory element being able to store software, logic, code, or processor instructions that can be executed to carry out the activities described in this Specification. A processor can execute any type of instructions associated with the data to achieve the operations detailed herein in this Specification. In one example, the processor (as shown in FIG. 14) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In one example implementation, content manager module 82a-e includes software in order to achieve the content management functions outlined herein. These activities can be facilitated by MCSs/MCC 144 and/or the various endpoints 112a-e. MCSs/MCC 144 and/or endpoints 112a-e can include memory elements for storing information to be used in achieving the intelligent content management functions, as outlined herein. Additionally, MCSs/MCC 144 and/or endpoints 112a-e may include a processor that can execute software or an algorithm to perform the content management controls, as discussed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any possible memory items (e.g., database, table, cache, etc.) should be construed as being encompassed within the broad term 'memory element.' Similarly, any of the potential processing elements, modules, and machines described in this Specification should be construed as being encompassed within the broad term 'processor.'

Note that with the examples provided herein, interaction may be described in terms of two or three elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and can accommodate a large number of rooms and sites, as well as more complicated/sophisticated arrangements and configurations. Accordingly, the examples provided herein should not limit the scope or inhibit the broad teachings of communication system 100 as potentially applied to a myriad of other architectures. Additionally, although described with reference to particular scenarios where MCSs/MCC 144 resides in a particular physical location, MCSs/MCC 144 can reside in any location, provided it has some connectivity to a suitable network.

The terms "virtual meeting" and "online meeting" are used interchangeably throughout the present disclosure. Both terms relate to the broad concept of transmitting and receiving meeting related data between different endpoints that may, e.g., be remote from one another.

It is also important to note that the procedures and/or steps discussed with reference to FIGS. 5, 6, and 11 (or and of FIGS. 1-14) illustrate only some of the possible scenarios that may be executed by, or within, communication system 100. Some of these procedures and/or steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular embodiments, it should be understood that various other changes, substitutions, and alterations may be made hereto without departing from the spirit and scope of the present disclosure. For example, although some portions of the present disclosure may have been described as operating in virtual conferencing environments or arrangements such as WEBEX and/or MEETINGPLACE, the present disclosure may be used in any virtual environment that could benefit from such technology. For example, in certain instances, computers that are coupled to each other in some fashion can utilize the teachings of the present disclosure (e.g., even though participants would be in a face-to-face arrangement). The content management paradigm disclosed herein could still be respected by those meeting participants: even when they are physically co-located. Virtually any configuration that seeks to intelligently manage content (e.g., by disallowing portions of content) could enjoy the benefits of the present disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method comprising:
receiving, at a first endpoint, an input associated with sharing data in a virtual meeting, the first endpoint involved in the virtual meeting with a second endpoint;
scanning at least one window associated with an application that is running on the first endpoint to determine a dataset for sharing, via the virtual meeting, with the second endpoint;
identifying a portion of the dataset to restrict based on analyzing the dataset against a metric;
generating, by the first endpoint, a graphical notification that includes a first indicia, a second indicia, and a third indicia, wherein the first indicia identifies the portion of the dataset to restrict, the second indicia identifies a window of the at least one window in which the portion of the dataset to restrict is included, and the third indicia identifies a duration of time that counts down to when the graphical notification is no longer displayed at the first endpoint;
rendering, on the first endpoint, an image of the portion of the dataset to restrict as it appears in the window when an additional input is received at the first indicia; and
preventing the window from being transmitted, via the virtual meeting, to the second endpoint based on a determination that the window includes the portion of the dataset to restrict.

2. The method of claim 1, further comprising transmitting, via the virtual meeting, the window that includes the portion of the dataset to restrict to the second endpoint based on an additional input received using the graphical notification.

3. The method of claim 1, wherein the scanning the at least one window associated with the application that is running on the first endpoint comprises:
scanning a hidden window that is hidden from being displayed; and
scanning a visible window that is generated for display, wherein the hidden window and the visible window are associated with the application that is running on the first endpoint.

4. The method of claim 1, wherein the scanning the at least one window associated with the application that is running on the first endpoint comprises scanning all windows that are associated with all applications that are that are running on the first endpoint.

5. The method of claim 1, further comprising:
generating, by the first endpoint, a new window, wherein the new window is not one of the at least one window and the new window is defined, in part, by coordinates that correspond to a visible region of a screen;
prior to revealing the new window, storing an image of content that is being generated for display, by the first endpoint, within the coordinates;
determining whether to transmit, via the virtual meeting, the new window to the second endpoint;
when a determination is made to transmit the new window to the second endpoint, transmitting, via the virtual meeting, a rendering of the new window; and
when a determination is made to not transmit the new window to the second endpoint transmitting, via the virtual meeting, the image instead of the new window.

6. The method of claim 1, further comprising:
counting down the duration of time during which the window that includes the portion of the dataset to restrict is prevented from being transmitted, via the virtual meeting, to the second endpoint; and transmitting, via the virtual meeting, the window that includes the portion of the dataset to restrict to the second endpoint based on the duration of time elapsing.

7. The method of claim 1, wherein the image includes bounding boxes that highlight the location of the restricted content.

8. One or more non-transitory media that includes code for execution and when executed by one or more processors performs operations comprising:

receiving, at a first endpoint, an input associated with sharing data in a virtual meeting, the first endpoint involved in the virtual meeting with a second endpoint;

scanning at least one window associated with an application that is running on the first endpoint to determine a dataset for sharing, via the virtual meeting, with the second endpoint;

identifying a portion of the dataset to restrict based on analyzing the dataset against a metric;

generating, by the first endpoint, a graphical notification that includes a first indicia, a second indicia, and a third indicia, wherein the first indicia identifies the portion of the dataset to restrict, the second indicia identifies a window of the at least one window in which the portion of the dataset to restrict is included, and the third indicia identifies a duration of time that counts down to when the graphical notification is no longer displayed at the first endpoint;

rendering, on the first endpoint, an image of the portion of the dataset to restrict as it appears in the window when an additional input is received at the first indicia; and preventing the window from being transmitted, via the virtual meeting, to the second endpoint based on a determination that the window includes the portion of the dataset to restrict.

9. The one or more non-transitory media of claim 8, the operations further comprising transmitting, via the virtual meeting, the window that includes the portion of the dataset to restrict to the second endpoint based on an additional input received using the graphical notification.

10. The one or more non-transitory media of claim 8, wherein the scanning the at least one window associated with the application that is running on the first endpoint comprises:

scanning a hidden window that is hidden from being displayed; and scanning a visible window that is generated for display, wherein the hidden window and the visible window are associated with the application that is running on the first endpoint.

11. The one or more non-transitory media of claim 8, wherein the scanning the at least one window associated with the application that is running on the first endpoint comprises scanning all windows that are associated with all applications that are that are running on the first endpoint.

12. The one or more non-transitory media of claim 8, the operations further comprising:

generating a new window, wherein the new window is not one of the at least one window and the new window is defined, in part, by coordinates that correspond to a visible region of a screen;

prior to revealing the new window, storing an image of content that is being generated for display, by the first endpoint, within the coordinates;

determining whether to transmit, via the virtual meeting, the new window to the second endpoint;

when a determination is made to transmit the new window to the second endpoint, transmitting, via the virtual meeting, a rendering of the new window; and when a determination is made to not transmit the new window to the second endpoint transmitting, via the virtual meeting, the image instead of the new window.

13. The one or more non-transitory media of claim 8, the operations further comprising:

counting down the duration of time during which the window that includes the portion of the dataset to restrict is prevented from being transmitted, via the virtual meeting, to the second endpoint; and transmitting, via the virtual meeting, the window that includes the portion of the dataset to restrict to the second endpoint based on the duration of time elapsing.

14. The one or more non-transitory media of claim 8, wherein the image includes bounding boxes that highlight the location of the restricted content.

15. An endpoint comprising:

a memory element configured to store electronic code, a processor operable to execute instructions associated with the electronic code, and a content manger module configured to interface with the processor and comprising electronic code, that when executed by the processor, performs operations comprising:

receiving an input associated with sharing data in a virtual meeting, the endpoint involved in the virtual meeting with an other endpoint;

scanning at least one window associated with an application that is running on the endpoint to determine a dataset for sharing, via the virtual meeting, with the other endpoint;

identifying a portion of the dataset to restrict based on analyzing the dataset against a metric;

generating a graphical notification that includes a first indicia, a second indicia, and a third indicia, wherein the first indicia identifies the portion of the dataset to restrict, the second indicia identifies a window of the at least one window in which the portion of the dataset to restrict is included, and the third indicia identifies a duration of time that counts down to when the graphical notification is no longer displayed at the endpoint;

rendering, on the first endpoint, an image of the portion of the dataset to restrict as it appears in the window when an additional input is received at the first indicia; and preventing the window of the at least one window from being transmitted, via the virtual meeting, to the other endpoint based on a determination that the window includes the portion of the dataset to restrict.

16. The endpoint of claim 15, wherein the operations further comprise transmitting, via the virtual meeting, the window that includes the portion of the dataset to restrict to the other endpoint based on an additional input received using the graphical notification.

17. The endpoint of claim 15, wherein the scanning the at least one window associated with the application that is running on the endpoint comprises:

scanning a hidden window that is hidden from being displayed; and scanning a visible window that is generated for display, wherein the hidden window and the visible window are associated with the application that is running on the endpoint.

18. The endpoint of claim 15, wherein the scanning the at least one window associated with the application that is running on the endpoint comprises scanning all windows that are associated with all applications that are that are running on the endpoint.

19. The endpoint of claim 15, wherein the operations further comprise:
   generating a new window, wherein the new window is not one of the at least one window and the new window is defined, in part, by coordinates that correspond to a visible region of a screen;
   prior to revealing the new window, storing an image of content that is being generated for display, by the endpoint, within the coordinates;
   determining whether to transmit, via the virtual meeting, the new window to the other endpoint;
   when a determination is made to transmit the new window to the other endpoint, transmitting, via the virtual meeting, a rendering of the new window; and
   when a determination is made to not transmit the new window to the other endpoint, transmitting, via the virtual meeting, the image instead of the new window.

20. The endpoint of claim 15, wherein the content manger module is configured to perform the operations further comprising:
   counting down the duration of time during which the window that includes the portion of the dataset to restrict is prevented from being transmitted, via the virtual meeting, to the second endpoint; and
   transmitting, via the virtual meeting, the window that includes the portion of the dataset to restrict to the other endpoint based on the duration of time elapsing on the countdown timer.

21. The endpoint of claim 15, wherein the image includes bounding boxes that highlight the location of the restricted content.

* * * * *